(12) United States Patent
Dibben et al.

(10) Patent No.: US 10,763,699 B2
(45) Date of Patent: Sep. 1, 2020

(54) INDUCTIVE POWER TRANSFER

(71) Applicant: Philips IP Ventures B.V., Eindhoven (NL)

(72) Inventors: Jonathan Richard Dibben, Cambridge (GB); Willy Henri Lemmens, Heverlee (BE); David James Hough, Cambridge (GB); Hendrik Cannoodt, Evergem (BE); John De Clercq, Evergem (BE)

(73) Assignee: PHILIPS IP VENTURES B.V., Eindhoven (NL)

( * ) Notice: Subject to any disclaimer, the term of this patent is extended or adjusted under 35 U.S.C. 154(b) by 65 days.

(21) Appl. No.: 15/903,695

(22) Filed: Feb. 23, 2018

(65) Prior Publication Data

US 2018/0191200 A1    Jul. 5, 2018

Related U.S. Application Data

(63) Continuation of application No. 14/278,683, filed on May 15, 2014, now Pat. No. 9,906,044, which is a
(Continued)

(30) Foreign Application Priority Data

Dec. 21, 2007 (GB) .................................... 0724981.6
Dec. 21, 2007 (GB) .................................... 0724982.4

(51) Int. Cl.
*H02J 50/12* (2016.01)
*H02J 50/30* (2016.01)
(Continued)

(52) U.S. Cl.
CPC .............. *H02J 50/12* (2016.02); *B60L 53/12* (2019.02); *B60L 53/124* (2019.02); *B60L 53/30* (2019.02);
(Continued)

(58) Field of Classification Search
CPC .. H02J 50/12; H02J 50/80; H02J 50/90; H02J 50/40; H02J 50/60; H02J 50/30;
(Continued)

(56) References Cited

U.S. PATENT DOCUMENTS 5,202,664 A    4/1993 Poulsen
5,898,579 A    4/1999 Boys et al.
(Continued)

FOREIGN PATENT DOCUMENTS

EP    0 298 707    1/1989
EP    0 903 830    3/1999
(Continued)

OTHER PUBLICATIONS

Merritt, Purcell, Stroink; "Uniform Magnetic Field Produced by Three, Four, and Five Square Coils;" Rev. Sci. Instrum.; Jul. 1983; pp. 879-882; vol. 54 No. 7.
(Continued)

*Primary Examiner* — Rexford N Barnie
*Assistant Examiner* — Jagdeep S Dhillon

(57) ABSTRACT

A detection method for use in a primary unit of an inductive power transfer system, the primary unit being operable to transmit power wirelessly by electromagnetic induction to at least one secondary unit of the system located in proximity to the primary unit and/or to a foreign object located in said proximity, the method comprising: driving the primary unit so that in a driven state the magnitude of an electrical drive signal supplied to one or more primary coils of the primary unit changes from a first value to a second value; assessing the effect of such driving on an electrical characteristic of the primary unit; and detecting in dependence upon the assessed effect the presence of a said secondary unit and/or a foreign object located in proximity to said primary unit.

20 Claims, 23 Drawing Sheets

Related U.S. Application Data continuation of application No. 12/809,119, filed as application No. PCT/GB2008/004189 on Dec. 18, 2008, now Pat. No. 8,766,487.

(51) Int. Cl.

| | |
|---|---|
| *H02J 50/15* | (2016.01) |
| *H02J 50/40* | (2016.01) |
| *H02J 50/80* | (2016.01) |
| *H02J 50/90* | (2016.01) |
| *H02J 50/60* | (2016.01) |
| *H01F 38/14* | (2006.01) |
| *H02J 7/00* | (2006.01) |
| *B60L 53/124* | (2019.01) |
| *B60L 53/12* | (2019.01) |
| *B60L 53/30* | (2019.01) |
| *H02J 7/04* | (2006.01) |

(52) U.S. Cl.
CPC ............ *H01F 38/14* (2013.01); *H02J 7/0029* (2013.01); *H02J 50/15* (2016.02); *H02J 50/30* (2016.02); *H02J 50/40* (2016.02); *H02J 50/60* (2016.02); *H02J 50/80* (2016.02); *H02J 50/90* (2016.02); *H02J 7/045* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/14* (2013.01); *Y02T 90/168* (2013.01); *Y04S 30/12* (2013.01); *Y10T 307/297* (2015.04); *Y10T 307/461* (2015.04); *Y10T 307/625* (2015.04); *Y10T 307/735* (2015.04)

(58) Field of Classification Search
CPC ...... H02J 50/15; H02J 5/00; H02J 7/00; H02J 7/02; H02J 7/04; H02J 3/00; H02J 3/12; H02J 3/04; H02J 17/00; H01F 38/14; H04B 7/00
USPC .......... 307/104, 11, 17, 39, 66, 64; 320/101, 320/106–109, 112–116; 323/205, 206, 323/247, 355–359; 455/127.1, 550.1
See application file for complete search history.

(56) References Cited

U.S. PATENT DOCUMENTS

| | | | |
|---|---|---|---|
| 6,459,218 B2 | 10/2002 | Boys et al. | |
| 6,515,878 B1 | 2/2003 | Meins et al. | |
| 6,548,985 B1 | 4/2003 | Hayes et al. | |
| 6,650,213 B1 | 11/2003 | Sakurai et al. | |
| 6,803,744 B1 | 10/2004 | Sabo | |
| 6,906,495 B2 | 6/2005 | Cheng et al. | |
| 7,042,196 B2 | 5/2006 | Ka-Lai et al. | |
| 7,164,255 B2 | 1/2007 | Hui | |
| 7,211,986 B1* | 5/2007 | Flowerdew | H02J 7/025 320/108 |
| 7,432,622 B2 | 10/2008 | Griepentrog et al. | |
| 7,518,337 B2 | 4/2009 | Beart et al. | |
| 7,554,316 B2* | 6/2009 | Stevens | H02J 50/12 323/355 |
| 7,576,514 B2 | 8/2009 | Hui | |
| 7,605,496 B2* | 10/2009 | Stevens | H02J 50/80 307/17 |
| 7,913,606 B2 | 3/2011 | Schneider et al. | |
| 7,989,986 B2 | 8/2011 | Baarman et al. | |
| 8,204,531 B2* | 6/2012 | Jin | H02J 5/005 455/522 |
| 2004/0000974 A1 | 1/2004 | Odenaal et al. | |
| 2005/0212634 A1 | 9/2005 | Baldwin et al. | |
| 2007/0145830 A1 | 6/2007 | Lee et al. | |
| 2007/0216392 A1* | 9/2007 | Stevens | H02J 5/005 323/355 |
| 2007/0287508 A1 | 12/2007 | Telefus | |
| 2008/0278112 A1 | 11/2008 | Hui et al. | |
| 2009/0015197 A1 | 1/2009 | Sogabe et al. | |
| 2009/0108805 A1 | 4/2009 | Liu et al. | |
| 2009/0230777 A1 | 9/2009 | Baarman et al. | |
| 2010/0109443 A1 | 5/2010 | Cook et al. | |
| 2010/0190435 A1 | 7/2010 | Cook et al. | |

FOREIGN PATENT DOCUMENTS

| | | | |
|---|---|---|---|
| EP | 1 022 840 | 7/2000 | |
| EP | 2 211 438 | 7/2010 | |
| GB | 2 117 579 | 10/1983 | |
| GB | 2 388 716 | 11/2003 | |
| GB | 2 389 720 | 12/2003 | |
| GB | 2414121 A * | 11/2005 | ............ H01F 38/14 |
| JP | H09-103037 | 4/1997 | |
| JP | H10-215530 | 8/1998 | |
| JP | H11-095922 | 4/1999 | |
| JP | 2000-295796 | 10/2000 | |
| WO | 95/11544 | 4/1995 | |
| WO | 95/11545 | 4/1995 | |
| WO | 01/16995 | 3/2001 | |
| WO | 03/105308 | 12/2003 | |
| WO | 2005/109597 | 11/2005 | |
| WO | 2007/042953 | 4/2007 | |
| WO | 2007/146223 | 12/2007 | |
| WO | 2008/035248 | 3/2008 | |
| WO | 2008/137996 | 11/2008 | |
| WO | 2009/040807 | 4/2009 | |
| WO | 2009/047768 | 4/2009 | |
| WO | 2009/081115 | 7/2009 | |
| WO | 2009/081126 | 7/2009 | |
| WO | 2009/116025 | 9/2009 | |
| WO | 2009/147664 | 12/2009 | |
| WO | 2005/109598 | 11/2010 | |

OTHER PUBLICATIONS

Achterberg, Lomonova, De Boeij; "Coil Array Structures Compared for Contactless Battery Charging Platform;" IEEE Transactions on Magnetics; May 2008; pp. 617-622; vol. 44, No. 5.

Hui, Ho; "A New Generation of Universal Contactless Battery Charging Platform for Portable Consumer Electronic Equipment;" 35th Annual IEEE Power Electronics Specialists Conference; 2004; pp. 638-644.

Sasada; "Three-Coil System for Producing Uniform Magnetic Fields;" Journal of the Magnetics Society of Japan; 2002; Abstract; vol. 27 No. 4.

Hatanaka, Sato, Matsuki, Kikuchi, Murakami, Kawase, Satoh; "Excited Composition of Primary Side in a Position-Free Contactless Power Station System;" 2002; pp. 580-584; vol. 26 No. 4.

Matsuki, Kikuchi, Murakami, Satoh, Hatanaka, Sato; "Power Transmission of a Desk With a Cord-Free Power Supply;" IEEE Transactions on Magnetics; Sep. 2002; pp. 3329-3331; vol. 38 No. 5.

Marder, "The Physics of SERAPHIM", Sandia National Laboratories; Oct. 2001.

Hatanaka, Sato, Matsuki, Kikuchi, Murakami, Satoh; "Coil Shape in a Desk-Type Contactless Power Station System;" Jan. 24, 2001; pp. 1015-1018; vol. 25 No. 4-2.

Sato, Adachi, Matsuki, Kikuchi; "The Optimum Design of Open Magnetic Circuit Meander Coil for Contactless Power Station System;" Digest of INTERMAG 99; May 1999; pp. GR09-GR09.

Tang, Hui, Chung; "Characterization of Coreless Printed Circuit Board (PCB) Transformers;" 1999; pp. 746-752.

Pedder, Brown, Skinner; "A Contactless Electrical Energy Transmission System;" IEEE Transactions on Industrial Electronics; Feb. 1999; pp. 23-30; vol. 46 No. 1.

Sato, Murakami, Suzuki, Matsuki, Kikuchi, Harakawa, Osada, Seki; "Contactless Energy Transmission to Mobile Loads by CLPS-Test Driving of an EV with Starter Batteries;" Sep. 1997; pp. 4203-4205; vol. 33 No. 5.

(56) References Cited

OTHER PUBLICATIONS

Murakami, Sato, Watanabe, Matsuki, Kikuchi, Harakawa, Satoh; "Consideration on Cordless Power Station-Contactless Power Transmission System;" IEEE Transactions on Magnetics; Sep. 1996; pp. 5037-5039; vol. 32 No. 5.
Sato, Murakami, Matsuki, Kikuchi, Harakawa, Satoh; "Stable Energy Transmission to Moving Loads Utilizing New CLPS;" IEEE Transactions on Magnetics; Sep. 1996; pp. 5034-5036; vol. 32 No. 5.
Donig, Melbert, Scheckel, Schon; "An Interface Circuit for Contactless Power and Data Transmission for Chipcard and Identification Systems;" Solid-State Circuits Conference, 1991; Sep. 1991; pp. 61-64; vol. 1.
Abel, Third; "Contactless Power Transfer—An Exercise in Topology;" IEEE Tranactions on Magnetics; Sep. 1984; pp. 1813-1815; vol. 20 Issue 5.
Carter; "Coil-System Design for Production of Uniform Magnetic Fields;" Proceedings of the Institution of Electrical Engineers; Nov. 1976; pp. 1279-1283; vol. 123 No. 11.
Written Opinion of the International Searching Authority, International Application No. PCT/GB2008/042206, International Filing Date Dec. 18, 2008.
Joep Jacobs, Andreas Averberg and Rik De Doncker, Multi-Phase Series Resonant DC-to-DC-Converters: Stationary Investigations, Power Electronics Specialists Conference, 2005, Jan. 1, 2005, pp. 660-666.
International Search Report, International Application No. PCT/GB2008/004189, International Filing Date Dec. 18, 2008.

\* cited by examiner

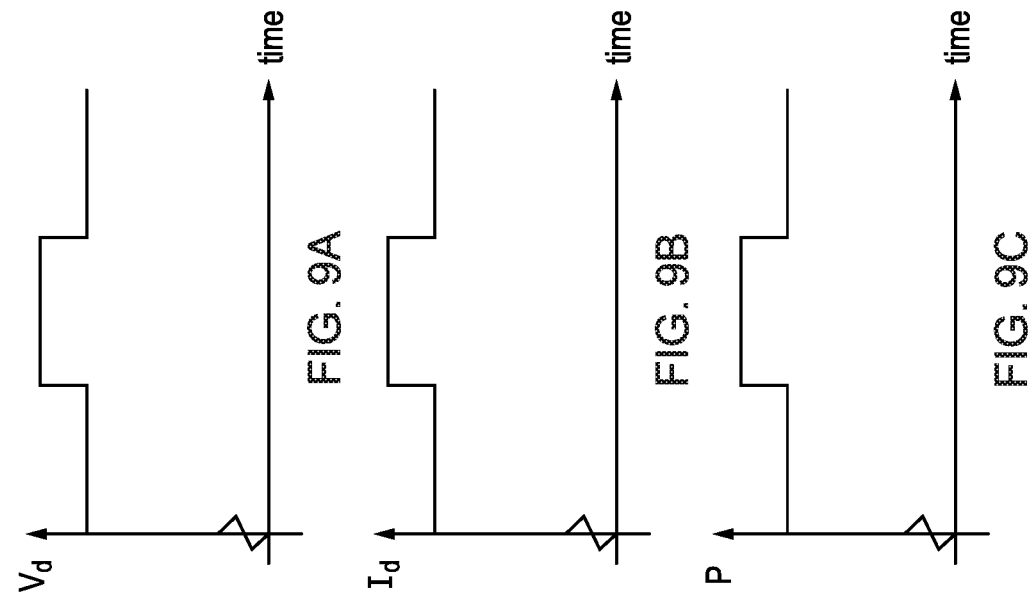
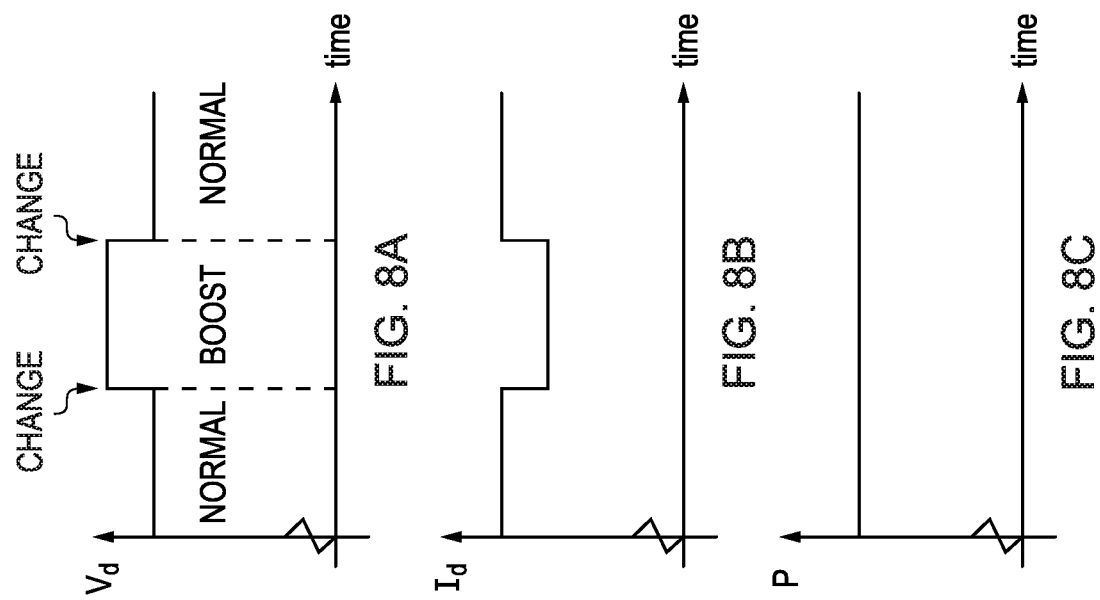

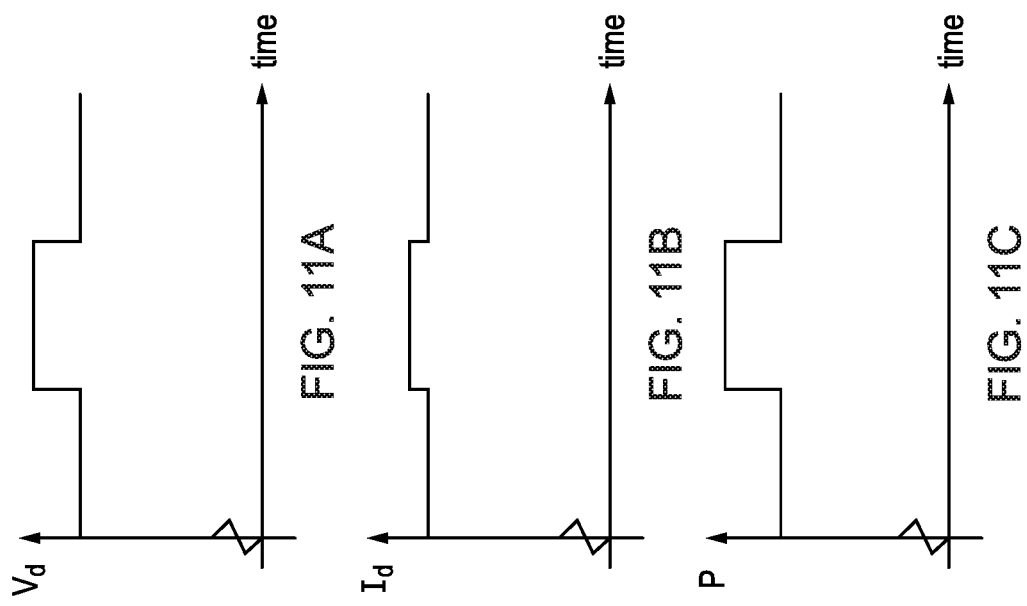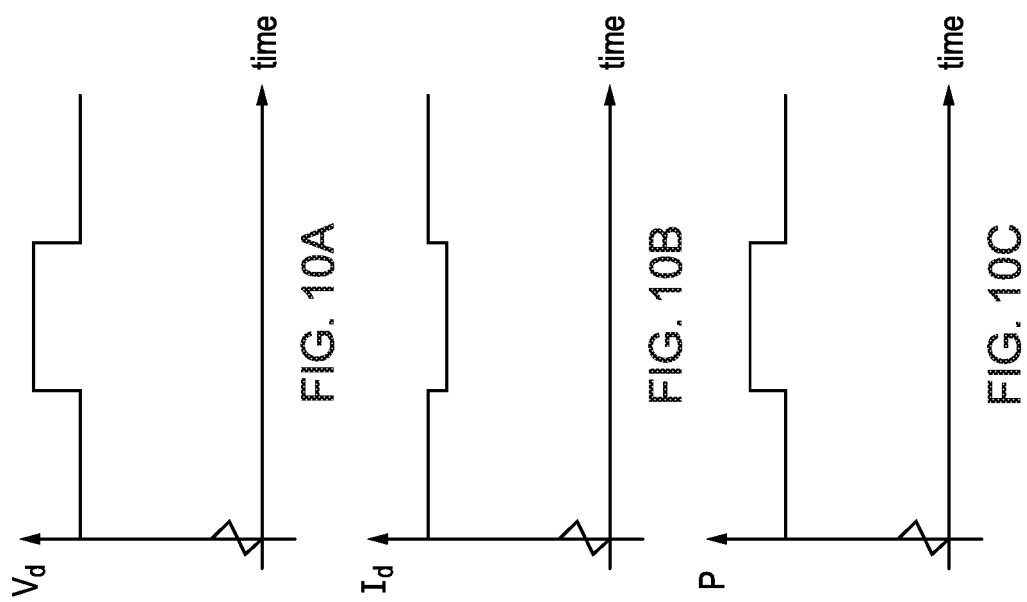

INDUCTIVE POWER TRANSFER

The present invention relates to inductive power transfer methods, apparatuses and systems for use, for example, to power portable electrical or electronic devices.

Inductive power transfer systems suitable for powering portable devices may consist of two parts:

A primary unit having at least one primary coil, through which it drives an alternating current, creating a time-varying magnetic flux.

A secondary unit, separable from the primary unit, having a secondary coil.

When the secondary coil is placed in proximity to the time-varying flux created by the primary coil, the varying flux induces an alternating current in the secondary coil, and thus power may be transferred inductively from the primary unit to the secondary unit.

Generally, the secondary unit supplies the transferred power to an external load, and the secondary unit may be carried in or by a host object (a secondary device) which includes the load. For example, the host object may be a portable electrical or electronic device having a rechargeable battery or cell. In this case, the load may be a battery charger circuit for charging the battery or cell. Alternatively, the secondary unit may be incorporated in such a rechargeable cell or battery (secondary device), together with a suitable battery charger circuit.

A class of such inductive power transfer systems is described in GB-A-2388716. A notable characteristic of this class of systems is the physically "open" nature of the magnetic system of the primary unit; a significant part of the magnetic path is through air. This permits the primary unit to supply power to different shapes and sizes of secondary unit, and to multiple secondary units simultaneously. Another example of such an "open" system is described in GB-A-2389720. Although focus will now be placed on such "open" and "multiple device" systems, this is merely by way of example and it will be appreciated that the present invention may extend to all inductive systems, for example to substantially "closed" systems in which there is a near 1:1 relationship between primary and secondary units with very little placement freedom.

Returning to "open" systems, such systems suffer from a number of problems. A first problem is that the primary unit cannot be 100% efficient. For example, switching losses in the electronics and $I^2R$ losses in the primary coil dissipate power even when there is no secondary unit present, or when no secondary units that are present require charge. This may waste energy so it may be desirable for the primary unit to enter a low-power "standby mode" in this situation.

A second problem in such systems is that it is generally not possible to mechanically prevent foreign objects (made of metal) from being placed into proximity with the primary coil and coupling to the coil. Foreign objects made of metal may have eddy-currents induced therein. Such eddy currents tend to act to exclude the flux, but because the material has resistance, the flowing eddy currents may cause $I^2R$ losses that may cause heating of the object.

There are, perhaps among others, two particular cases where this heating may be significant:

If the resistance of any metal is high, for example if it is impure or thin.

If the material is ferromagnetic, for example including steel. Such materials have high permeability, encouraging a high flux density within the material, and causing large eddy currents and therefore large $I^2R$ losses.

In the present application, such foreign objects that cause power drain are termed "parasitic loads". Optionally, the primary unit could enter a "shutdown mode" when parasitic loads are present, to avoid heating them.

Various approaches to solving these two problems have been previously considered.

Previously-considered approaches to solving the first problem, of not wasting power when no secondary unit requires charge, include the following:

In a first approach, the secondary unit modulates its inductive load during charging, causing a corresponding variation in the power taken from the primary unit so as to transmit information back to the primary unit. This indicates to the primary unit that it should stay out of the standby state.

In a second approach, the primary unit determines whether a secondary unit or foreign object is present based upon changes in the current flowing in and/or the voltage appearing across the primary coil. If a secondary unit requiring charge is detected, the primary unit may stay out of the standby state.

In a third approach, the primary unit varies the frequency of its drive, and thus the coupling factor to a tuned secondary unit (i.e. due to resonance). If the secondary unit is not taking power, there is no substantial difference in the power taken as the frequency is swept and thus the primary unit goes into a standby state.

In a fourth approach, the primary unit measures the power flowing in the primary coil, and enters a pulsing standby state if this is below a threshold.

In a fifth approach, the primary unit contains detecting coils which have power coupled back into them according to the position of the secondary unit. If the device is not present, the primary unit enters a standby mode.

In a sixth approach, the secondary unit has a mechanical protrusion that fits a slot in the primary unit, activating it.

In a seventh approach, the primary unit drives two coils, and there are a corresponding two power receiving secondary coils in the secondary unit. The primary unit measures the power delivered from each primary coil and enters standby mode if it is below a threshold.

In an eighth approach, the primary unit includes a resonant tank and control circuitry which serves to maintain slightly more energy in the resonant tank than is needed to supply power over the inductive link. If demand for power drops off, the control circuitry serves to shut down further build up of energy in the resonant tank.

In a ninth approach, the primary unit includes a comparator that detects the average current of the primary coils and compares that to a reference. If the average current is below the reference level, it is assumed that the primary unit is in the no-load state.

In a tenth approach, the primary unit places the primary coil into an undriven resonating condition during a measurement phase such that it acts as a resonant tank, and measures the decay of energy in the resonant tank to determine how much energy is being removed from it. The secondary units are caused to place a different load on the primary coil for different such measurement phases, and thus differences in power drawn from the primary unit will be detected if a secondary unit is present. In the absence of a secondary unit, the primary unit may enter a standby mode.

In an eleventh approach, the secondary unit(s) are set into a no-load state during a measurement phase, during which time the primary unit measures power drawn from its primary coil. If the power drawn from the primary coil does not substantially change as the measurement phase is entered, it is assumed that no secondary unit requiring power is present and the primary unit may enter a standby mode.

In a twelfth approach, the secondary unit(s) communicate information relating to their power requirement to the primary unit. The primary unit then measures power drawn from its primary coil and compares this to the power requirement. If no such information is received, the primary unit may determine that no secondary unit is present and may enter a standby mode.

Previously-considered solutions to the second problem, of parasitic loads, include:

In a thirteenth approach, the primary unit varies the frequency of its drive. In this system, the secondary unit is tuned, so this frequency variation will result in a variation of the power taken from the primary unit. If the load is instead a piece of metal, then varying the frequency will not have a substantial effect and the primary unit will enter a shutdown state.

In a fourteenth approach, a key in the secondary unit activates the primary unit. The assumption is that if a secondary unit is present then this will physically exclude any foreign objects.

In a fifteenth approach, the primary unit supplies power to the secondary unit by driving two primary coils. If the amount of power supplied by the two coils is different, the primary unit assumes that the load is not a valid secondary unit and enters shutdown mode.

In a sixteenth approach, the primary unit includes comparators which are used to detect imbalances between the voltages and currents in the coils of the primary unit. Such imbalances are considered to indicate detection of a foreign body.

In a seventeenth approach, the secondary unit modulates its inductive load during charging, causing a corresponding variation in the power taken from the primary unit so as to transmit information back to the primary unit. The assumption is that if such information is not received in the primary unit, either no secondary unit is present or a foreign object is present.

In an eighteenth approach, the primary unit determines whether a secondary unit or foreign object is present based upon changes in the current flowing in and/or the voltage appearing across the primary coil. If a foreign object is detected, the primary unit may enter shutdown mode.

In a nineteenth approach, the primary unit places the primary coil into an undriven resonating condition during a measurement phase. A series of measurement phases are carried out during which the secondary unit(s) place different loads on the primary coil. The measurement phases are configured such that the primary unit can determine whether or not an unexpected parasitic load (i.e. a foreign object) is present. If it is determined that a foreign object is present, the primary unit may enter shutdown mode.

In a twentieth approach, the secondary unit(s) are set into a no-load state during a measurement phase, during which time the primary unit measures power drawn from its primary coil. If the power drawn from the primary coil during the measurement phase is, for example, above a threshold, it is determined that a foreign object is present and the primary unit may enter a shutdown mode.

In a twentyfirst approach, the secondary unit(s) communicate information relating to their power requirement to the primary unit. The primary unit then measures power drawn from its primary coil and compares this to the power requirement. If the power drawn exceeds the power required by more than a threshold value, it is determined that a foreign object is present and the primary unit may enter a shutdown mode.

A number of these approaches assume a 1:1 relationship between the primary unit and the secondary unit. Therefore, they are not sufficient for systems such as those described in GB-A-2388716 where more than one secondary unit (or secondary device) at a time may be present. For example, they may not work when there are two secondary units present, one requiring charge and the other not.

Some of these approaches are not able to cope with a foreign object (e.g. a piece of metal) in the presence of valid secondary units. A number of those approaches assume that the physical or electrical presence of a valid secondary unit implies that all foreign objects are physically excluded by the secondary unit. This is not necessarily the case, particularly when the secondary units may be positioned arbitrarily in respect of the primary unit, as in those described in GB-A-2388716.

Some of these approaches are undesirable in terms of EMC (Electromagnetic Compatibility) performance. For example, the third and tenth approaches above involve frequency variations, and such variations can cause interference with other systems. Typically, inductive devices are designed to operate within an assigned frequency "chimney" or "window", i.e. within a certain frequency range separate from frequency ranges used by other systems. By fluctuating or varying frequencies of operation, inductive systems can have increased risk of falling foul of EMC requirements. These approaches will therefore be considered in more detail to highlight their possible disadvantages.

In the third approach, the system is resonant on the secondary side, but not resonant on the primary side. Thus, when a valid secondary device is placed in proximity to the primary unit, the overall circuit will have a resonant frequency. Consequently, changing the driving frequency will change the power delivered to the secondary side, and also, therefore, the current in the primary sense resistor. When there is no valid secondary device present, the system is not resonant, and therefore a change in driving frequency may, to a first order, not have a significant effect.

Not having a resonant primary side may be disadvantageous. Without the capacitance to oppose the impedance of the inductor, there is a high impedance load which is difficult to drive. The system may thus be inefficient. In a resonant system, energy is cycled between the inductor and the capacitor as the instantaneous voltage changes. Without the capacitance, energy that flows out of the inductor will simply be dissipated in the driver electronics.

If a resonant capacitor was added to the primary coil, then the system may not function properly, as follows. If a non-resonant foreign body was in proximity to the primary side, there would still be a change in power delivered and also sense current with frequency, because of the resonant primary side. The foreign body may change the inductance and resonant frequency in a non-predictable way. The primary circuit could be made resonant without a capacitor on the primary coil if there was a very strong coupling between the primary and secondary coils, by virtue of a capacitor on the secondary. However, this is not practical for contactless systems in which there is air in at least part of the magnetic circuit.

The previously-considered third approach uses a 10% frequency modulation to get sufficient signal to noise ratio. 10% is actually a very large change in frequency in spectral terms. Typically, there are certain "chimneys" where radiation is allowed and they may not be wide enough to accommodate this frequency variation. Another consideration is that the modulation itself may generate multiple harmonics which may extend a long way out in frequency, either side of the fundamental. The change in frequency also results in lower power delivered during some time intervals; the load may have to be able to cope with this periodic reduction in available power.

Turning to the previously-considered tenth approach, the system functions by allowing the primary unit to momentarily stop delivering power to the primary coil. This allows the energy in the system to decay to zero, and by measuring the rate of decay it is possible to measure the losses in the system. Three measurements are made to isolate parasitic losses from load losses and 'friendly parasitic losses' (e.g. metal components included in a valid secondary unit). A key disadvantage of this particular approach is that power is suspended, i.e. measurements are taken in the undriven state when power is not actively being transferred. It is therefore desirable to have a large capacitor in the secondary device. Such a capacitor may be physically large, and therefore undesirable for integration into modern secondary devices such as mobile telephones. However, one disadvantage is that switching the power off suddenly causes a transient, resulting in a broad spectrum of frequencies (cf. Fourier transform of a step response). As the energy decays, cycling between the inductor and capacitor, this energy is radiated from the primary coil, which may be exposed in an open system. This broad spectrum of radiated power may be problematic for EMC.

The previously-considered twentieth approach in which the secondary unit(s) are set into a no-load state during a measurement phase, can require the use of a large hold-up capacitor in each secondary unit to maintain power transfer during the measurement phases. This can be disadvantageous in terms of cost and size.

The previously-considered twentyfirst approach in which the secondary unit(s) communicate information relating to their power requirement to the primary unit requires a communication link to be implemented. This can be complex technically and, for example, may require a degree of collision-detection if multiple secondary units are present.

It is desirable to solve some or all of the above-mentioned problems.

According to an embodiment of a first aspect of the present invention, there is provided a detection method for use in a primary unit of an inductive power transfer system, the primary unit being operable to transmit power wirelessly by electromagnetic induction to at least one secondary unit of the system located in proximity to the primary unit and/or to a foreign object located in said proximity, the method including: driving the primary unit so that in a driven state the magnitude of an electrical drive signal supplied to one or more primary coils of the primary unit changes from a first value to a second value; assessing the effect of such driving on an electrical characteristic of the primary unit; and detecting in dependence upon the assessed effect the presence of a said secondary unit and/or a foreign object located in proximity to said primary unit.

The electrical characteristic of the primary unit may be a level of power being drawn from the primary unit, or for example a characteristic that varies as a function of the level of power being drawn.

In embodiments of the present invention, assessments (e.g. measurements) are made in the driven state, as opposed to in the undriven state. That is, it may not be necessary to suspend power transfer, and sizeable storage capacitors in the secondary unit may not be required. Furthermore, embodiments of the present invention are not dependent on frequency-variation techniques, which is advantageous both in terms of system capacity, and in terms of EMC performance. A "driven state" may be interpreted to mean when drive signals are actively supplied, rather than passively supplied. A primary unit may enter such a driven state even if it is in a "standby" or "shutdown" mode, for example by temporarily supplying drive signals actively.

Advantageously, by driving the primary unit in this way, it is possible to detect one or more secondary units and/or foreign objects in proximity to the primary unit. That is, the present method enables a "1:many" relationship between the primary unit and the secondary units and/or foreign objects to be handled, as well as a 1:1 relationship.

Such a method involves driving the primary unit so that a signal magnitude substantially changes. Such a change is desirably substantial (i.e. of substance) so that noise or other minor variations in power drawn are compensated for. One possible way of driving the primary unit in this way is to change a voltage level across one or more primary coils of the primary unit, as will become apparent below.

Such a method may be adapted to detect the presence of, and optionally differentiate between, secondary units requiring and not requiring power. Such a method may be suitable for controlling inductive power transfer in such an inductive power transfer system, and may include restricting or stopping the inductive power supply from the primary unit if a foreign object is detected, and/or if no secondary unit requiring power is detected.

Such driving includes controlling the primary unit so as to change the magnitude of an electrical drive signal supplied to one or more primary coils of the primary unit from a first value to a second value. Changing the magnitude of drive signals is a relatively straightforward driving method, which is therefore advantageous in terms of cost and complexity. In contrast, changing other parameters in respect of the drive signals can be complex and have undesirable side effects. For example, changing the frequency of the drive signals can result in poor EMC (Electromagnetic Compatibility) performance. In one embodiment, it is possible to slowly ramp up or down the magnitude of the drive signals, rather than change the magnitude in a stepwise fashion, so as to avert problems with transients.

The first and second values may characterise the electrical drive signal. For example, the drive signal may be a fluctuating or alternating signal, whose magnitude naturally changes over time, and such values may characterise the fluctuating or alternative signal (for example in terms of its peak value or RMS value).

Such values may be peak values or root-mean-square values of an alternating potential difference supplied across one or more primary coils of the primary unit. Similarly, such values may be peak values or root-mean-square values of an alternating current passing through one or more primary coils of the primary unit. These types of values can be relatively easy to control and maintain.

Signals in a primary coil of such a primary unit can take time to settle if their magnitudes are changed. Optionally, therefore, the method includes maintaining the first and second values steady for long enough for operation of the primary unit to stabilise.

The second value may be larger than the first value, or, conversely, the second value may be smaller than the first value. The second value may be between 5 and 50% (for example, 10%) larger or smaller than the first value. In one embodiment, it may be desirable for the second value to be larger than the first value, to aim to cause an increase in the amount of power drawn, for example in the case that a foreign object is present. Power regulation in the secondary unit may be by means of a Buck regulator, whose operation is generally more efficient when its input voltage is closer to its output voltage. A Buck regulator can generally only down-convert the voltage. Boost convertors, which can upconvert, are generally less efficient than Buck convertors. By aiming to increase the amount of power drawn, i.e. by boosting the voltage during the measurement phase, the voltage will be at the lower voltage for most of the time, and the efficiency will be better. In one embodiment, it may be desirable to use a Boost converter rather than a Buck converter/regulator.

The primary unit may include DC-AC conversion means (for example an inverter or other DC-to-AC converter) for converting DC electrical drive signals into time-varying electrical drive signals for supply to the one or more primary coils concerned. In that case, such driving may include controlling operation of the conversion means. Operation of the conversion means may be governed by a duty cycle, in which case the driving may include controlling the duty cycle of the DC-AC conversion means.

The primary unit may also include DC-DC conversion means for outputting the DC electrical drive signals in dependence upon DC input signals. In that case, such driving may include controlling the operation of the DC-DC conversion means. Operation of the DC-DC conversion means may be governed by a duty cycle, in which case the driving may include controlling the duty cycle of the DC-DC conversion means.

It may be more preferable to control the DC-DC conversion means than the DC-AC conversions means. A non-50% duty cycle in the DC-AC conversion means may result in even and odd harmonics. An even (e.g. $2^{nd}$) harmonic may be filtered less well by a resonant circuit than an odd harmonic because it is closer-in in frequency range.

Such driving may be considered to include reconfiguring operation of the primary unit from an existing state preceding the change to a changed state succeeding the change, both states being driven states of the primary unit. Such assessment may therefore include obtaining a measurement of the level of an electrical characteristic of the primary unit in the existing state and in the changed state, such as the level of power being drawn or a characteristic that varies as a function of the level of power being drawn. The method may include maintaining the first value during the existing state and maintaining the second value during the changed state. This may advantageously involve ensuring that the first and second values are maintained for long enough to obtain valid measurements.

Such assessment may include taking voltage and current measurements in respect of primary-coil signals. Such measurements need not be directly taken at the primary coil, and may for example be voltage and/or current measurements in respect of the DC electrical drive signals mentioned above. The measurements may be directly taken at the primary coil, or at least on the AC side of such conversion means, in which case they may be voltage and current measurements in respect of the time-varying electrical drive signals mentioned above.

The method may involve taking a series of samples of said voltages and currents, and basing such assessment on the series of samples. Such samples may be averaged or combined in some other way to improve the reliability of such assessment. For further such improvement, the driving and assessing may be considered to form a set of method steps, and the method may include carrying out a plurality of such sets and basing such detection on two or more of such sets. In this way, further averaging may be employed.

It may be determined that a said foreign object is present in proximity to said primary unit if it is determined that the electrical characteristic of the primary unit has substantially changed as a result of such driving. A foreign object (e.g. a set of keys or a lump of metal) may draw substantially more power if (for example) the voltage over the primary coil(s) is substantially increased, or draw substantially less power if that voltage is substantially decreased.

The or each said secondary unit of the system is optionally configured such that, when in proximity to the primary unit and receiving power inductively therefrom, an electrical characteristic of that secondary unit responds to such driving in an expected manner (e.g. it is a regulated secondary device), the method further including determining whether a said secondary unit and/or a foreign object is present in proximity to said primary unit in dependence upon results of such assessment and the or each such expected response. For example, the results may be compared with the or each expected response.

For the or each secondary unit the electrical characteristic of that secondary unit may be its power drawn from the primary unit, or for example a characteristic that varies as a function of its power drawn from the primary unit.

It may be determined that a foreign object is present if the results of the assessment at least partly do not correlate with (or correspond to, or map to, or bear the signature of) the or any said expected response. It may be determined that a secondary unit is present if the results of the assessment at least partly do correlate with the or one said expected response. It may be that, for the or at least one said secondary unit, the expected response is that its electrical characteristic does not substantially change in response to such driving. For example, the secondary units may be regulated, such that they draw the same amount of power from the primary unit as long as that amount of power is available.

The expected response for one said secondary unit may be different from the expected response for another such secondary unit. Such expected responses may be different because the secondary units concerned are of different types, and/or because the secondary units are incorporated in secondary devices of different types.

With this in mind, the method may further include, in the primary unit, receiving from the or each secondary unit that is in a power requiring state, information relating to the expected response for the secondary unit concerned. The information need not directly detail the relevant expected response. For example, the information may merely identify the type of secondary unit concerned, and the method may further include determining the expected response based upon the identified type of secondary unit concerned. For example, the primary unit may store (or have access to) information detailing expected responses for different types of secondary unit.

The method optionally includes employing, when carrying out the detection, secondary-unit compensation information relating to a parasitic load imposed on the primary unit by the or each secondary unit so as to compensate for said parasitic load of the or each secondary unit. For example, in this way it may be possible to compensate for metal (or some other parasitic load) present in the secondary unit(s) that is expected to be present and is thus unavoidable. Without this compensation, it is possible that substantial parasitic load in the secondary unit(s) may be detected as constituting a foreign body. Such secondary-unit compensation information may be received by the primary unit from the or each secondary unit.

Part or all of such information received in the primary unit from one or more secondary unit may be received via a communication link separate from a link constituted by the transfer of inductive power, for example over an RFID link or some other separate communications link, radio or otherwise. For example, infrared or ultrasound communication may be used. Part or all of such information may be received via an inductive communication link constituted by the transfer of inductive power. Any combination of communication links may be employed.

The method may further include employing, when carrying out such detection, primary-unit compensation information relating to losses in the primary unit itself so as to compensate for said losses. For example, in this way it may be possible to compensate for metal (or some other parasitic load) present in the primary unit that is expected to be present and is thus unavoidable. Without this compensation, it is possible that substantial parasitic load in the primary unit itself may be detected as constituting a foreign body. Part or all of such primary-unit compensation information may be derived from measurements taken by the primary unit when it is effectively in electromagnetic isolation.

Following detection of a foreign object in proximity to the primary unit, the method may include restricting or stopping inductive power supply from the primary unit. This may be referred to as entering a "shutdown" mode of operation. Following detection of one or more secondary units requiring power, the method may include maintaining or adjusting inductive power supply from the primary unit to meet such requirement. This may be referred to as entering an "operating" or "normal" mode of operation. Following detection of one or more secondary units not requiring power in the absence of one or more secondary units requiring power, the method may include restricting or stopping inductive power supply from the primary unit. This may be referred to as entering a "standby" mode of operation.

It may be desirable to detect a condition for entering a standby mode in addition to detecting when to enter the shutdown mode. For example, in the method of the first aspect it is possible to restrict or stop the inductive power supply in the event that the expected behaviour of a secondary unit requiring power is not detected, which may be the result of all present secondary units not requiring power (rather than the result of a foreign object being present). The primary unit may be configured to require user input to exit shutdown mode, but not require user input to exit standby mode.

The present invention may lend itself in some embodiments to driving a single primary coil, and in other embodiments to driving a plurality of different primary coils. For example, one embodiment may include switching between one primary coil driven with a signal of a first magnitude to a second primary coil driven with a signal of a second magnitude, or for example switching between driving a first number of primary coils (e.g. one) and driving a second number of primary coils (e.g. two or more) simultaneously, the second number being different from the first number.

According to an embodiment of a second aspect of the present invention, there is provided a primary unit for use in an inductive power transfer system, the primary unit being operable to transmit power wirelessly by electromagnetic induction to at least one secondary unit of the system located in proximity to the primary unit and/or to a foreign object located in said proximity, the primary unit including: driving means (e.g. driving circuitry) operable to drive the primary unit so that an amount of power drawn from the primary unit by a purely-resistive load in proximity thereto would substantially change; means (e.g. circuitry) for assessing the effect of such driving on an electrical characteristic of the primary unit; and means (e.g. circuitry) for detecting in dependence upon the assessed effect the presence of a said secondary unit and/or a foreign object located in proximity to said primary unit.

According to an embodiment of a third aspect of the present invention, there is provided an inductive power transfer system, including a primary unit and at least one secondary unit, the primary unit being operable to transmit power wirelessly by electromagnetic induction to at least one said secondary unit located in proximity to the primary unit and/or to a foreign object located in said proximity, the system including: driving means (e.g. driving circuitry) operable to drive the primary unit so that an amount of power drawn from the primary unit by a purely-resistive load in proximity thereto would substantially change; means (e.g. circuitry) for assessing the effect of such driving on an electrical characteristic of the primary unit; and means (e.g. circuitry) for detecting in dependence upon the assessed effect the presence of a said secondary unit and/or a foreign object located in proximity to said primary unit.

According to an embodiment of a fourth aspect of the present invention, there is provided a computer program which, when executed on a computing device of a primary unit, causes the primary unit to carry out a detection method according to the aforementioned first aspect of the present invention. Such a computer program may be stored on any suitable carrier medium, and may be transmitted as a carrier signal over a communication link, such link for example being part of the Internet.

According to an embodiment of a fifth aspect of the present invention, there is provided a system for transferring power from a primary unit to a secondary unit separable from the primary unit by electromagnetic induction; the primary unit including: a primary coil; an alternating voltage or current source coupled to the primary coil; means (e.g. circuitry) for adjusting the voltage or current of the primary coil between at least two levels; means (e.g. circuitry) for determining the power drawn by the primary coil; the secondary unit including: a secondary coil; a voltage or current converter; wherein said voltage or current regulator acts such that the power drawn from the secondary coil is a known function of voltage or current input level; wherein the primary unit measures the power drawn by the primary coil in at least two primary coil voltage or current levels and in dependence stops or restricts power to the primary coil.

According to an embodiment of a sixth aspect of the present invention, there is provided a primary unit for transferring power to a secondary unit separable from the primary unit by electromagnetic induction; the primary unit including: a primary coil; an alternating voltage or current source coupled to the primary coil; means (e.g. circuitry) for adjusting the voltage or current of the primary coil between at least two levels; means (e.g. circuitry) for determining the power drawn by the primary coil; wherein the primary unit measures the power drawn by the primary coil in at least two primary coil voltage or current levels and in dependence stops or restricts power to the primary coil.

According to an embodiment of a seventh aspect of the present invention, there is provided a method for transferring power from a primary unit to a secondary unit separable from the primary unit by electromagnetic induction; the method including the steps of: supplying alternating current or voltage to a primary coil in the primary unit; taking a first measurement of the power drawn in the primary unit; changing the magnitude of the current or voltage supplied to the primary unit; taking a second measurement of the power drawn in the primary unit; in dependence of the results of the first and second measurement stopping or restricting the magnitude of the alternating current or voltage supplied to the primary coil in the primary unit.

According to an embodiment of an eighth aspect of the present invention, there is provided a system for transferring power from a primary unit to a secondary unit separable from the primary unit by electromagnetic induction; the primary unit including: a primary coil; an alternating voltage or current source coupled to the primary coil; means (e.g. circuitry) for adjusting the voltage or current of the primary coil between at least two levels; means (e.g. circuitry) for determining the power drawn by the primary coil; the secondary unit including: a secondary coil; a voltage or current converter; wherein said voltage or current converter acts such that the power drawn from the secondary coil is substantially independent of the voltage or current at the secondary coil; wherein the primary unit measures the power drawn by the primary coil in at least two primary coil voltage or current levels and stops or restricts power if there is a substantial difference.

According to an embodiment of a ninth aspect of the present invention, there is provided a primary unit for transferring power to a secondary unit separable from the primary unit by electromagnetic induction; the primary unit including: a primary coil; an alternating voltage or current source coupled to the primary coil; means (e.g. circuitry) for adjusting the voltage or current of the primary coil between at least two levels; means (e.g. circuitry) for determining the power drawn by the primary coil; wherein the primary unit measures the power drawn by the primary coil in at least two primary coil voltage or current levels and stops or restricts power if there is a substantial difference.

According to an embodiment of a tenth aspect of the present invention, there is provided a method for transferring power from a primary unit to a secondary unit separable from the primary unit by electromagnetic induction; the method including the steps of: supplying alternating current or voltage to a primary coil in the primary unit; taking a first measurement of the power drawn in the primary unit; changing the magnitude of the current or voltage supplied to the primary unit; taking a second measurement of the power drawn in the primary unit; stopping or restricting supply of current or voltage to the primary coil in the primary unit if there is a substantial difference between the first and second measurement.

According to an embodiment of an eleventh aspect of the present invention, there is provided a detection method for use in a primary unit of an inductive power transfer system, the primary unit being operable to transmit power wirelessly by electromagnetic induction to at least one secondary unit of the system located in proximity to the primary unit and/or to a foreign object located in said proximity, the method including: driving the primary unit so that an amount of power drawn from the primary unit by a purely-resistive load (or an unregulated load, or a test unit including substantially only a purely-resistive load, or a load that is non-resonant at frequencies in the vicinity of a frequency of operation of the primary unit) in proximity thereto would substantially change; assessing the effect of such driving on an electrical characteristic of (e.g. a level of power being drawn from) the primary unit; and detecting in dependence upon the assessed effect the presence of a said secondary unit and/or a foreign object located in proximity to said primary unit.

According to an embodiment of a twelfth aspect of the present invention, there is provided a voltage and/or current-mode detection method for use in a primary unit of an inductive power transfer system, the primary unit being operable to transmit power wirelessly by electromagnetic induction to at least one secondary unit of the system located in proximity to the primary unit and/or to a foreign object located in said proximity, the method including: driving the primary unit so that an amount of power drawn from the primary unit by a purely-resistive load (or an unregulated load, or a test unit including substantially only a purely-resistive load, or a load that is non-resonant at frequencies in the vicinity of a frequency of operation of the primary unit) in proximity thereto would substantially change; assessing the effect of such driving on an electrical characteristic of (e.g. a level of power being drawn from) the primary unit; and detecting in dependence upon the assessed effect the presence of a said secondary unit and/or a foreign object located in proximity to said primary unit.

According to an embodiment of a thirteenth aspect of the present invention, there is provided a detection method for use in a primary unit of an inductive power transfer system, the primary unit being operable to transmit power wirelessly by electromagnetic induction to at least one secondary unit of the system located in proximity to the primary unit and/or to a foreign object located in said proximity, the method including: driving the primary unit so that in a driven state an amount of power drawn from the primary unit by a purely-resistive load (or an unregulated load, or a test unit including substantially only a purely-resistive load, or a load that is non-resonant at frequencies in the vicinity of a frequency of operation of the primary unit) in proximity thereto would substantially change; assessing the effect of such driving on an electrical characteristic of (e.g. a level of power being drawn from) the primary unit; and detecting in dependence upon the assessed effect the presence of a said secondary unit and/or a foreign object located in proximity to said primary unit.

Further aspects (and thus embodiments) of the present invention are envisaged, for example being one of the aforementioned aspects in which the secondary unit has a voltage regulator, a current regulator, a combination of voltage and current regulation, or a power regulator.

Method aspects may apply by analogy to primary-unit aspects, system aspects and computer-program aspects, and vice versa.

Reference will now be made, by way of example, to the accompanying drawings in which.

Figure 4:
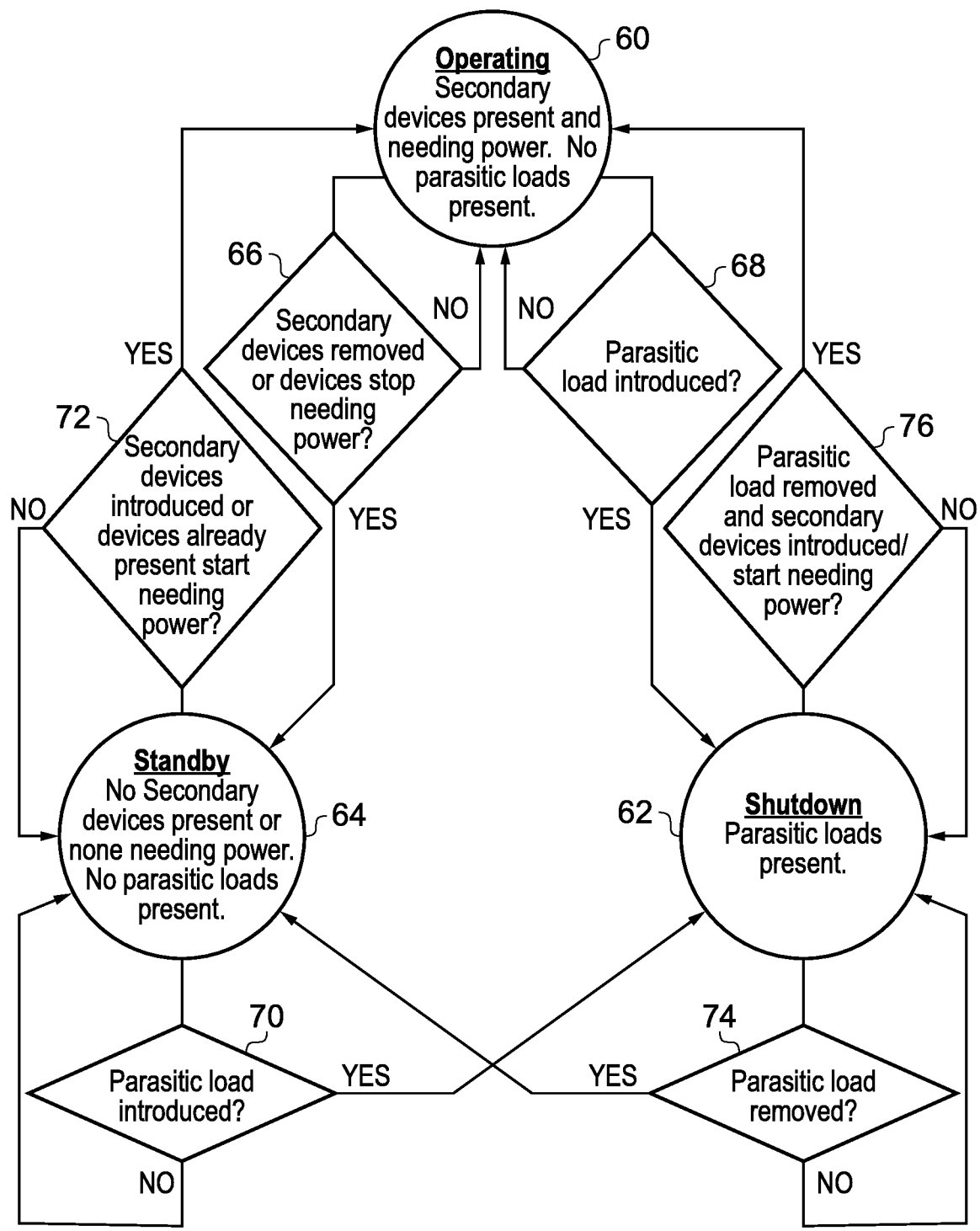
FIG. 4 is a schematic diagram illustrating the different modes of operation in the FIG. 1 system and the conditions for switching between these different modes.
Figure 6:
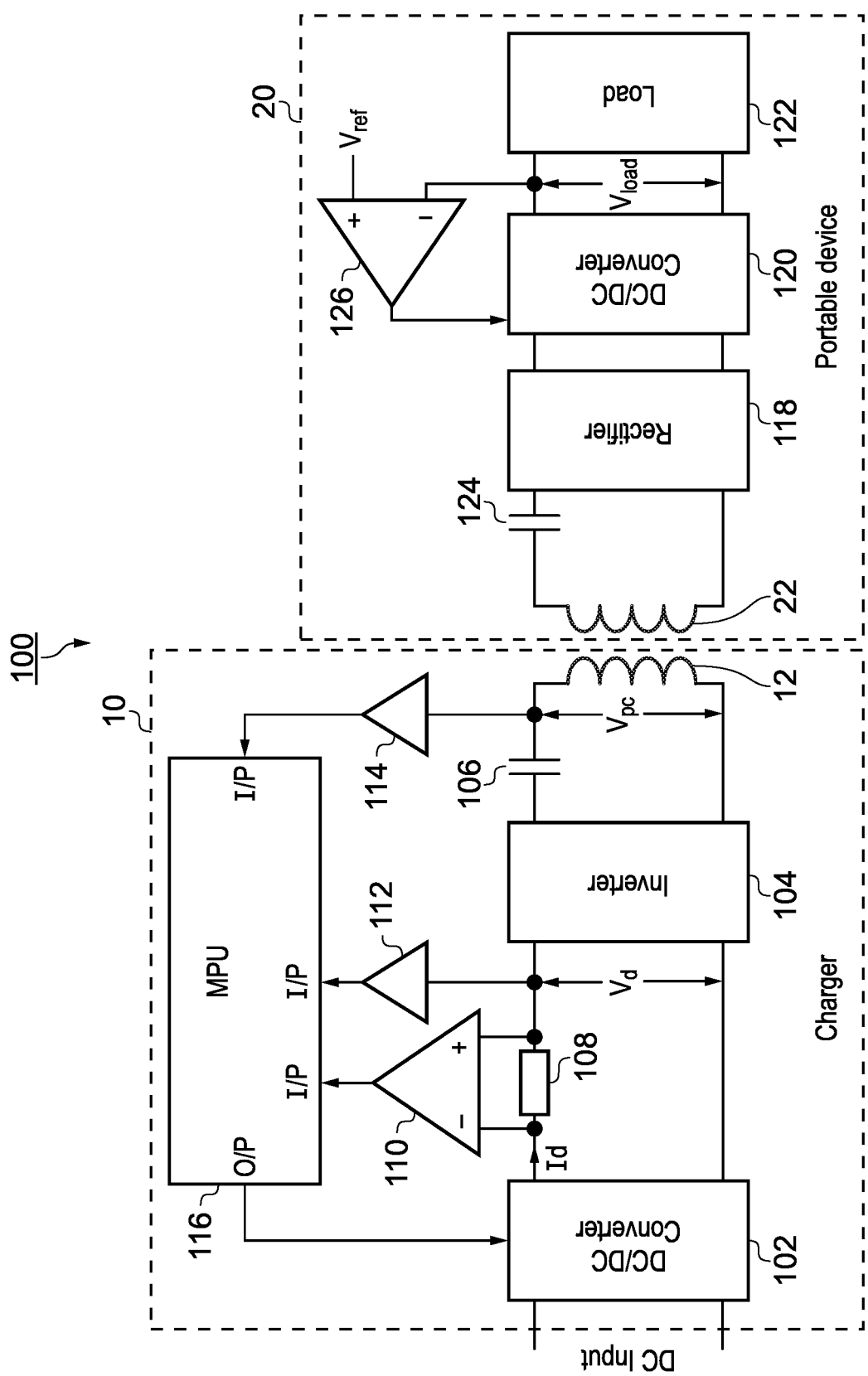
Figure 12:
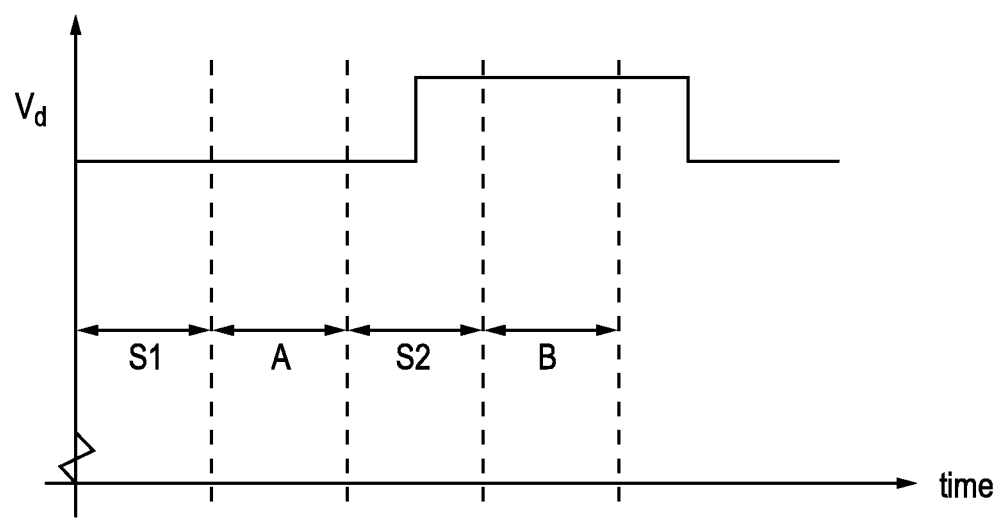
Figure 13A:
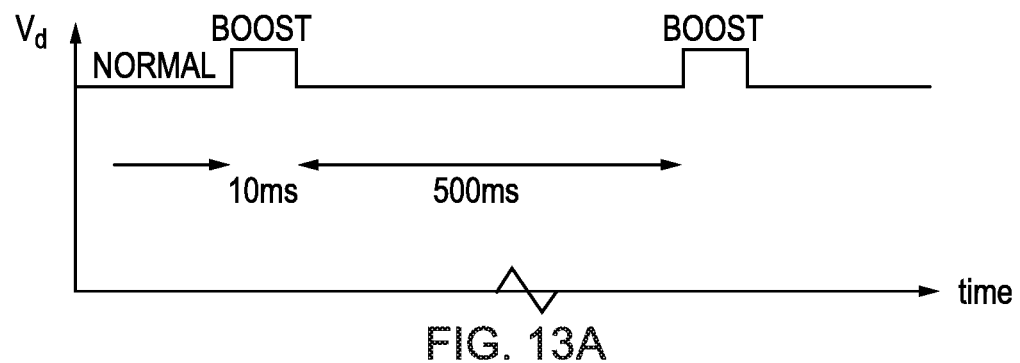
Figure 13B:
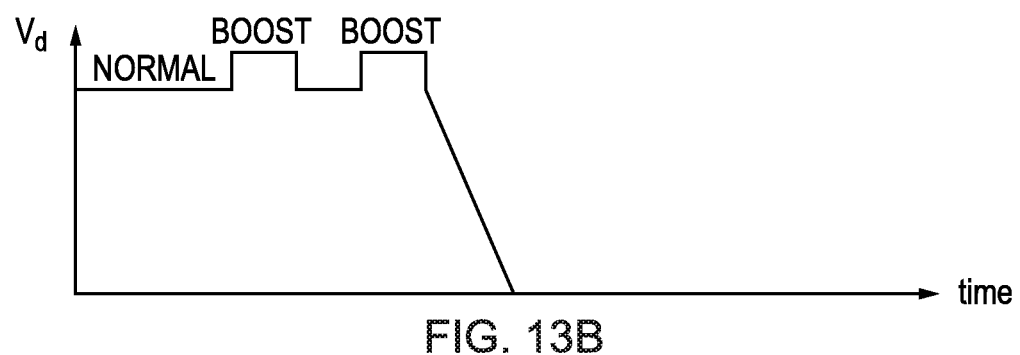
Figure 13C:
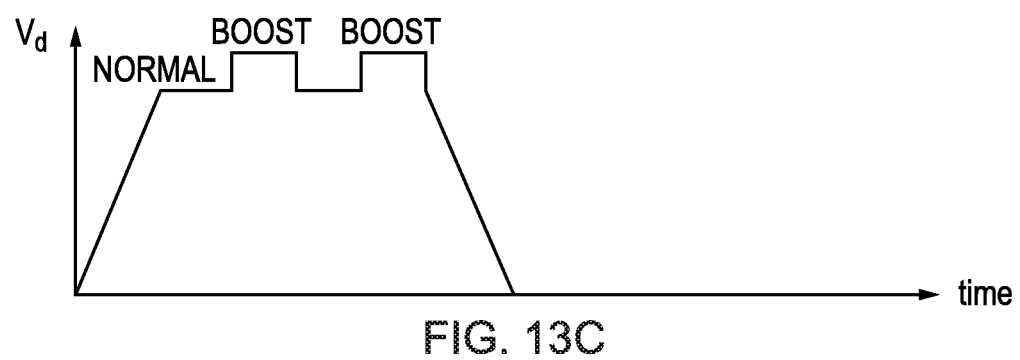
Figure 14:
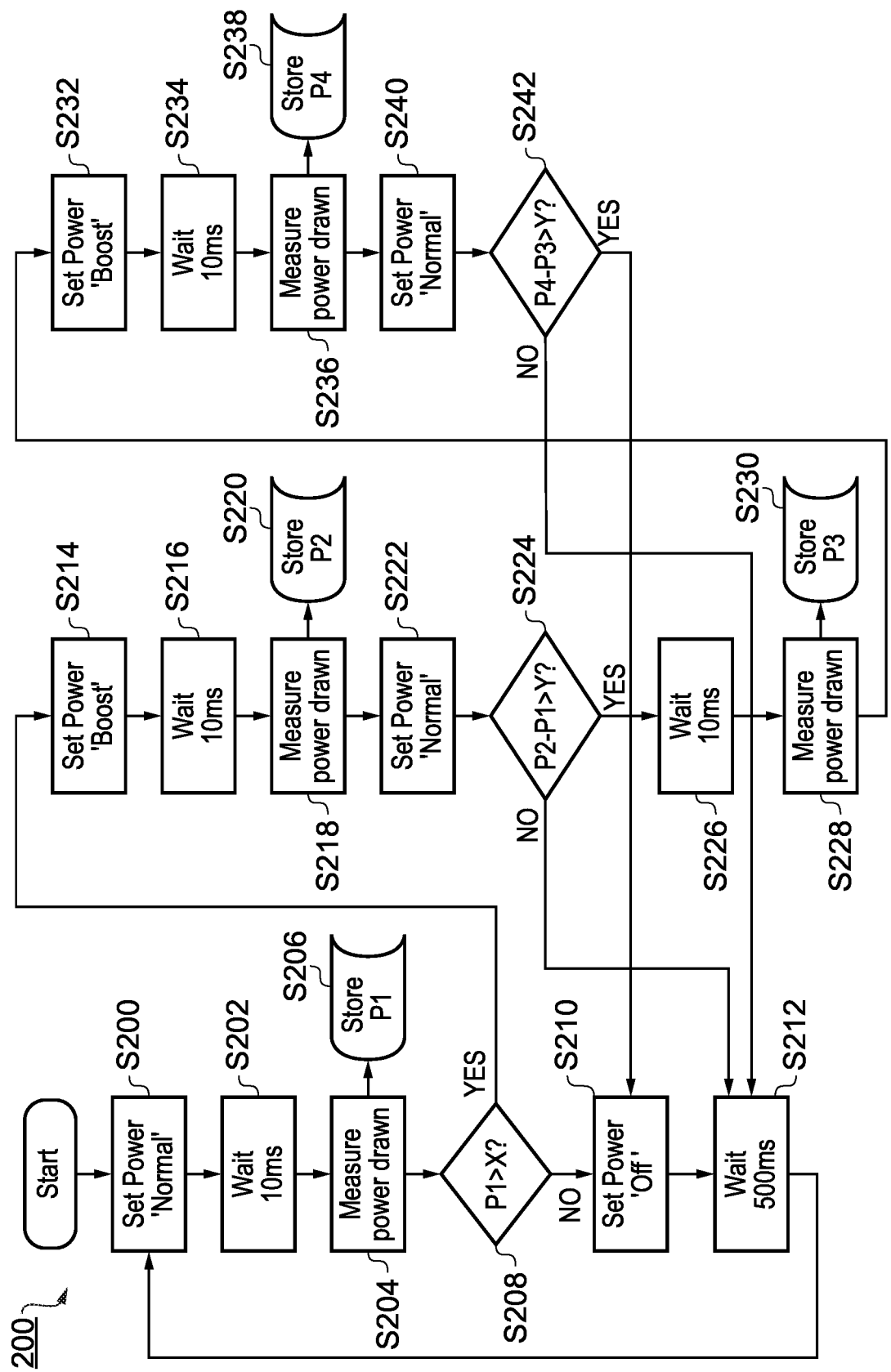
Figure 15:
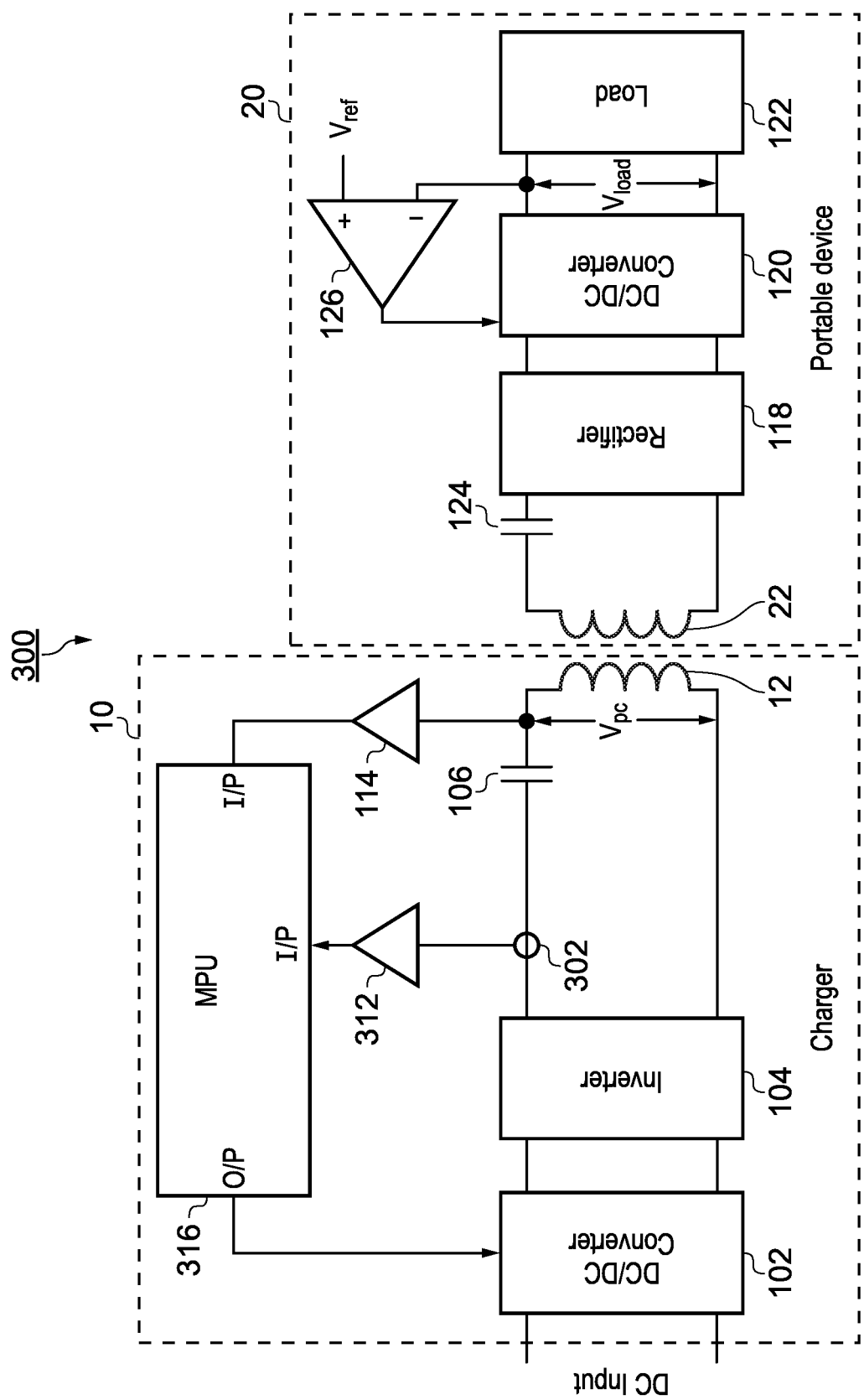
Figure 16:
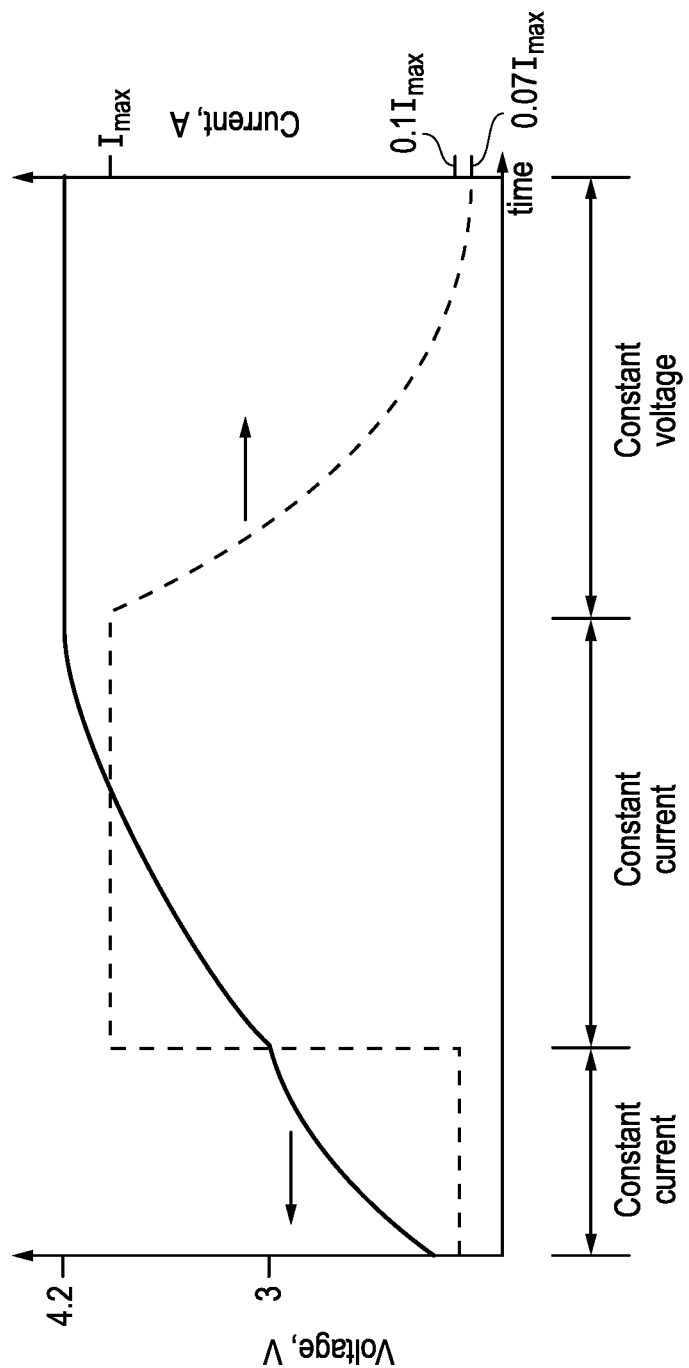
Figure 17:
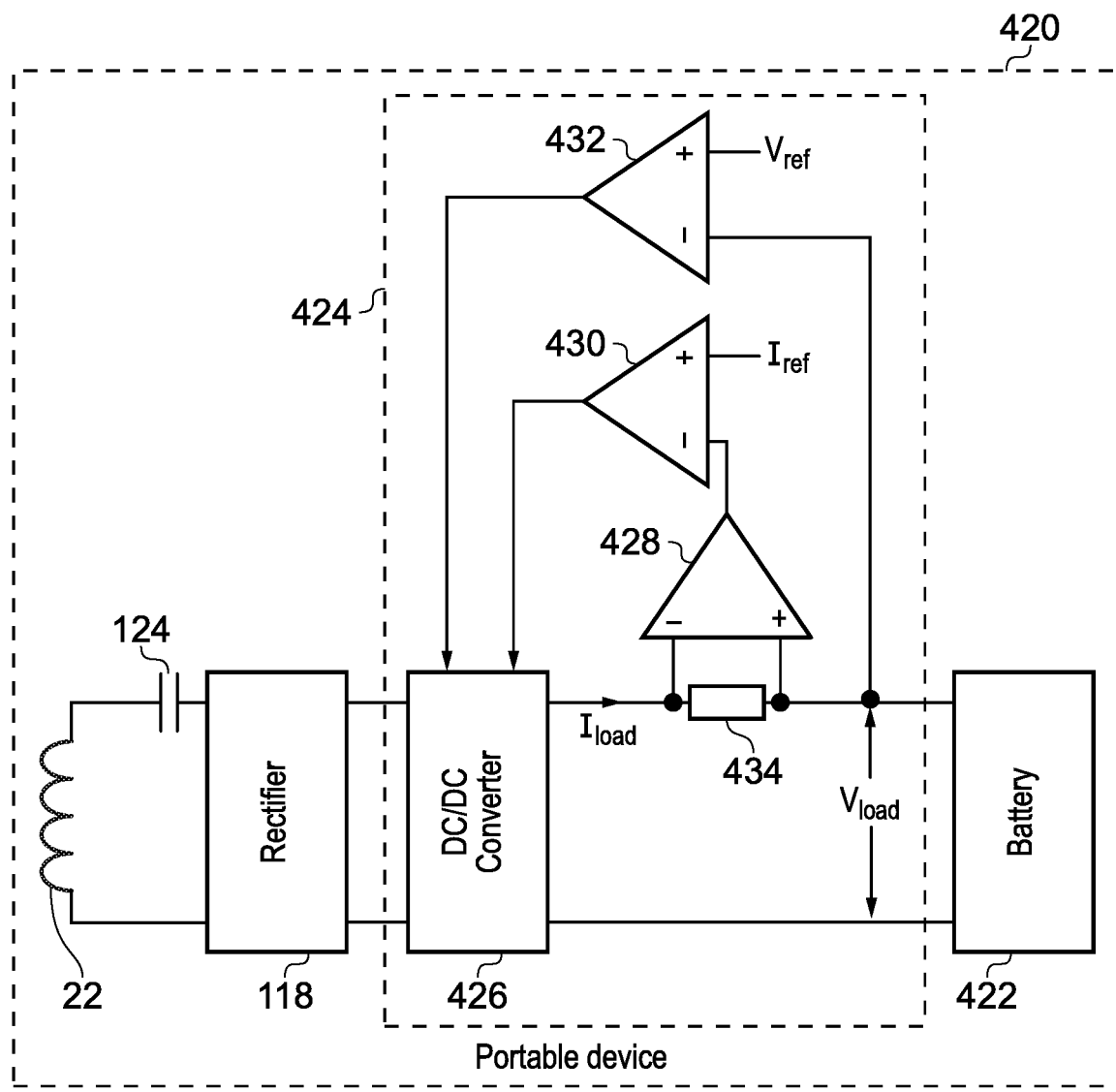
Figure 18:
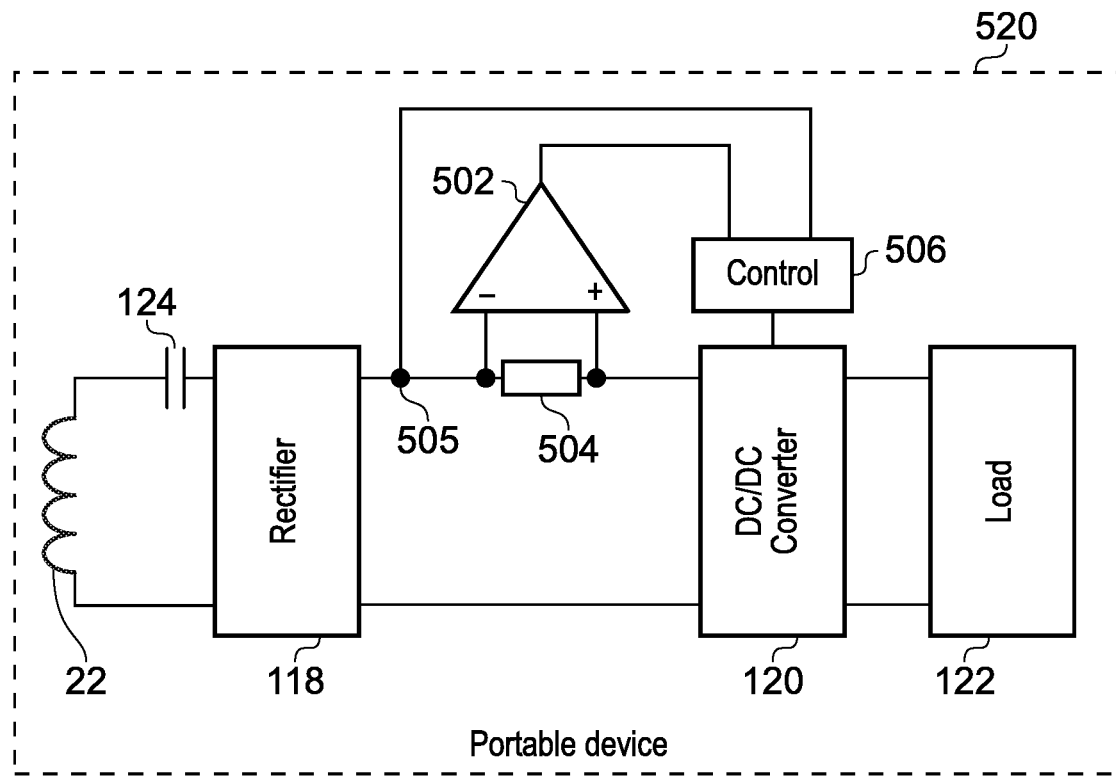
Figure 19:
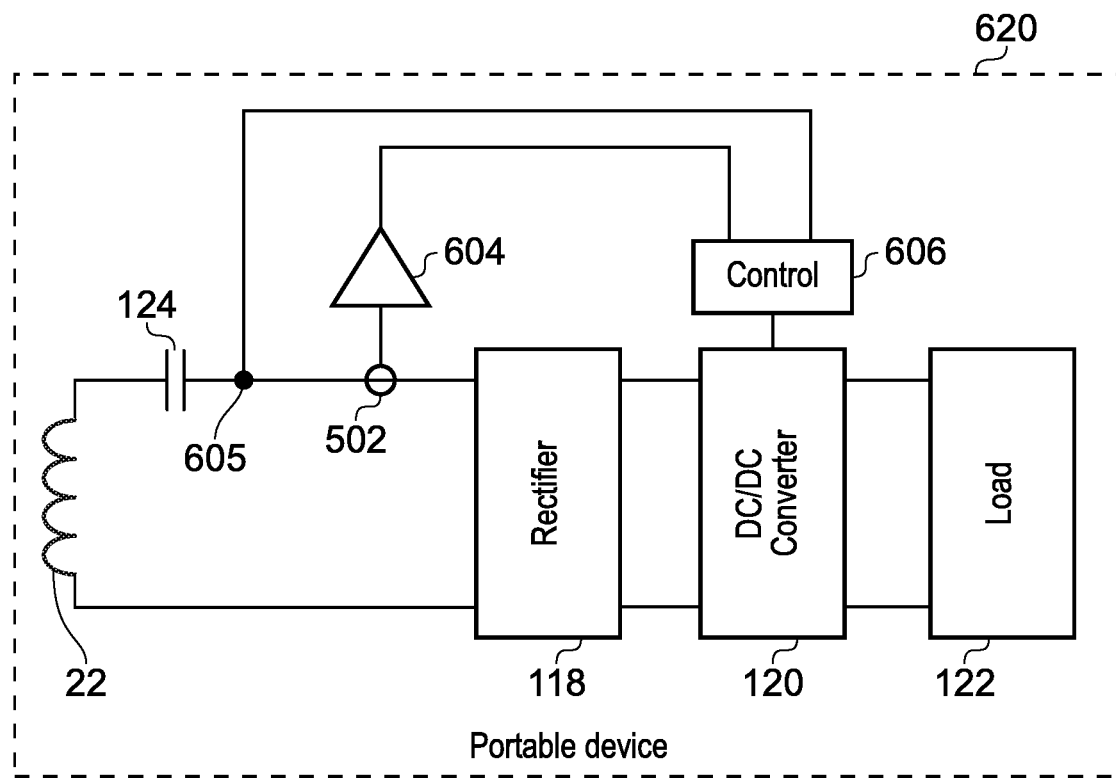
Figure 20:
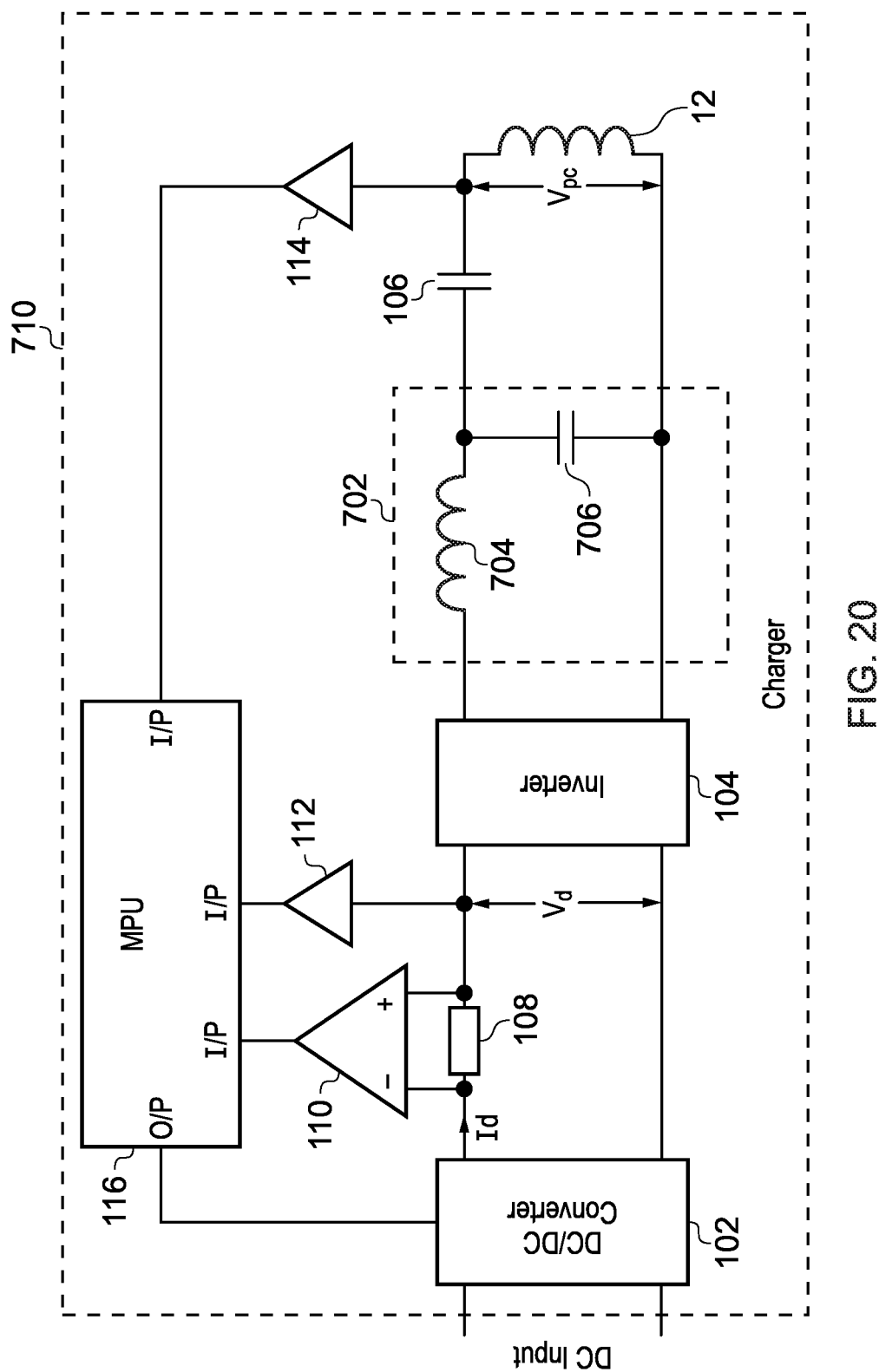
Figure 21:
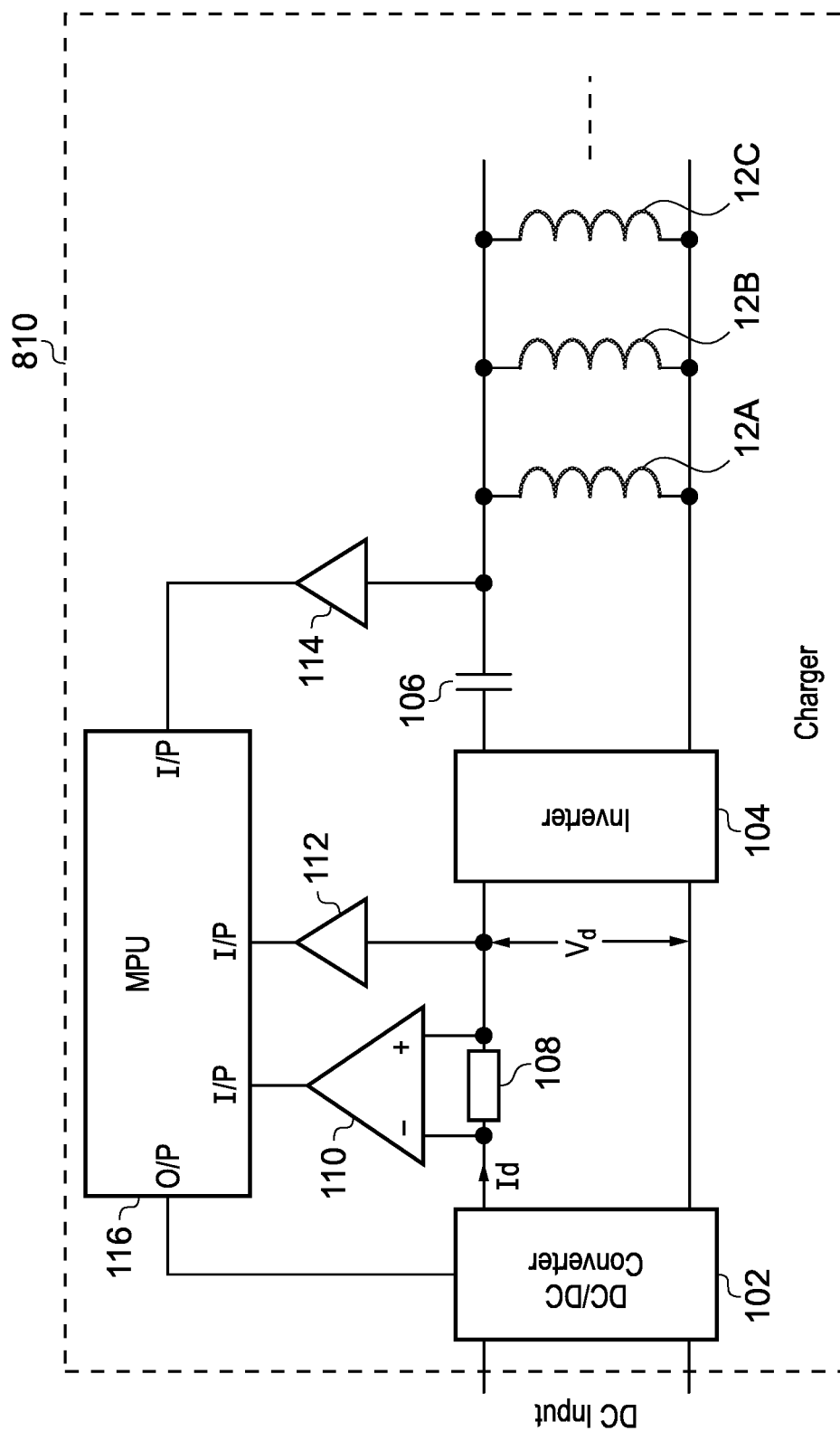
Figure 22:
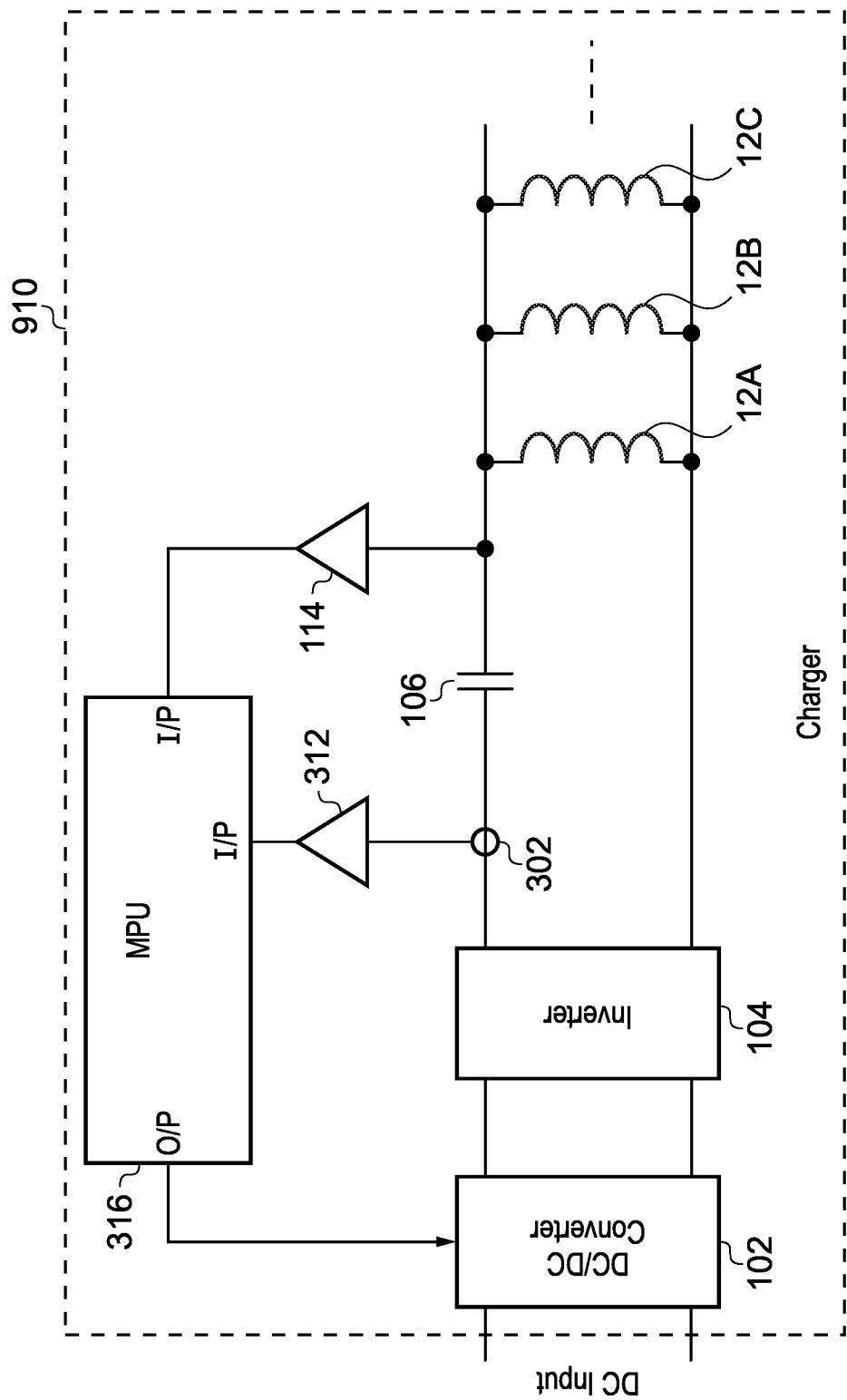
Figure 23:
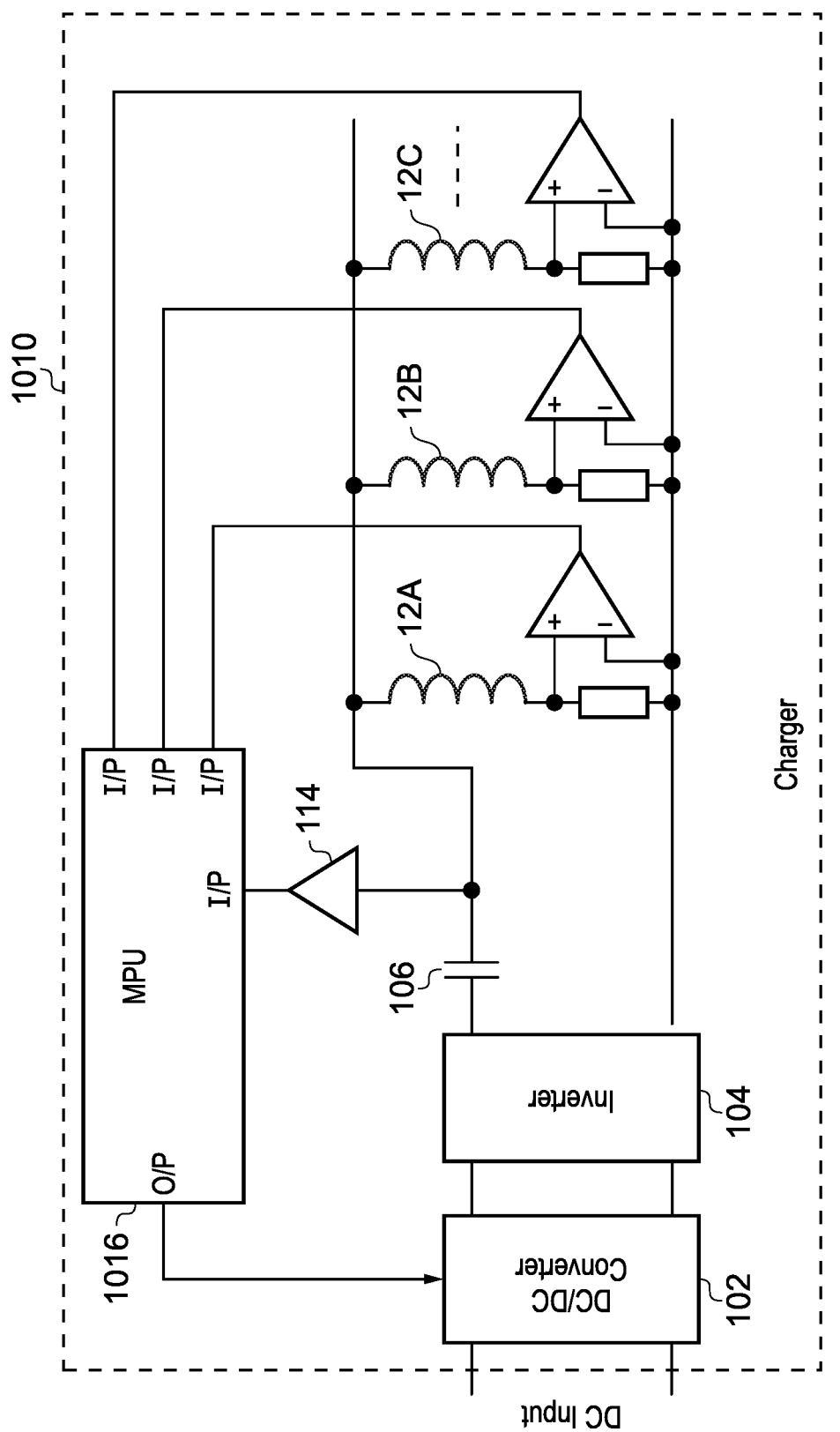
Figure 24:
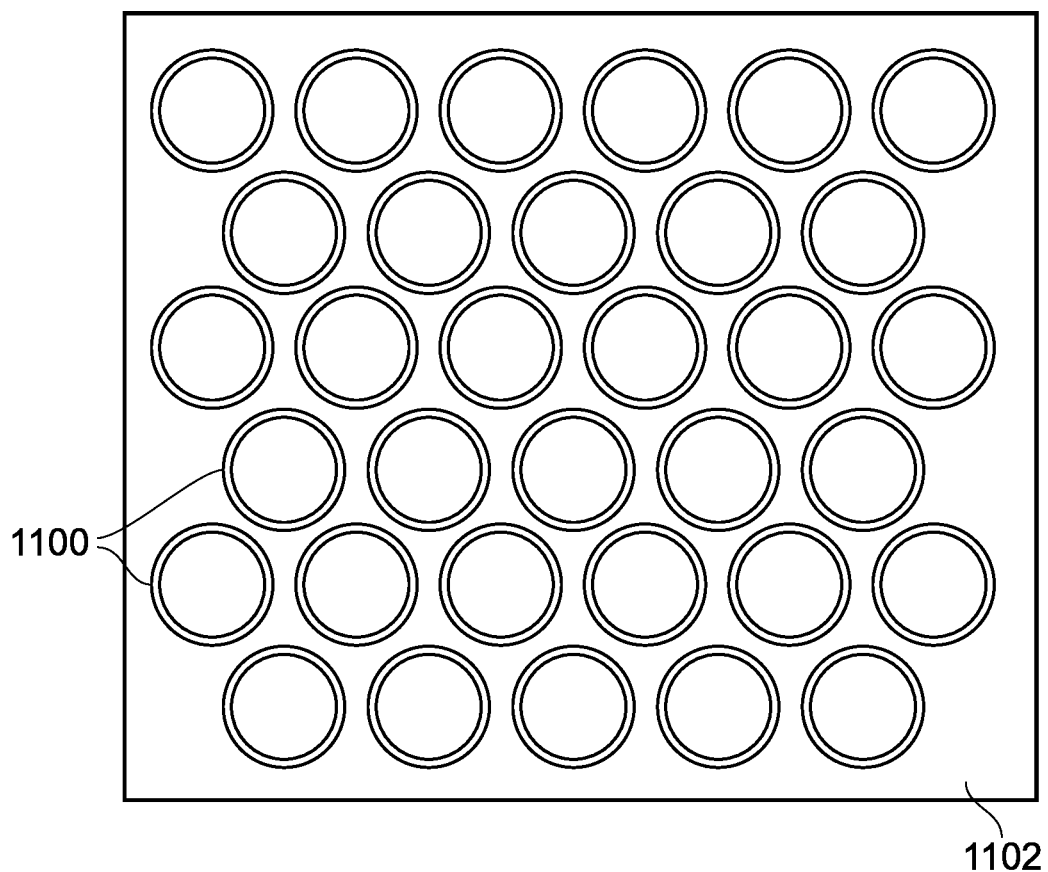
Figure 25:
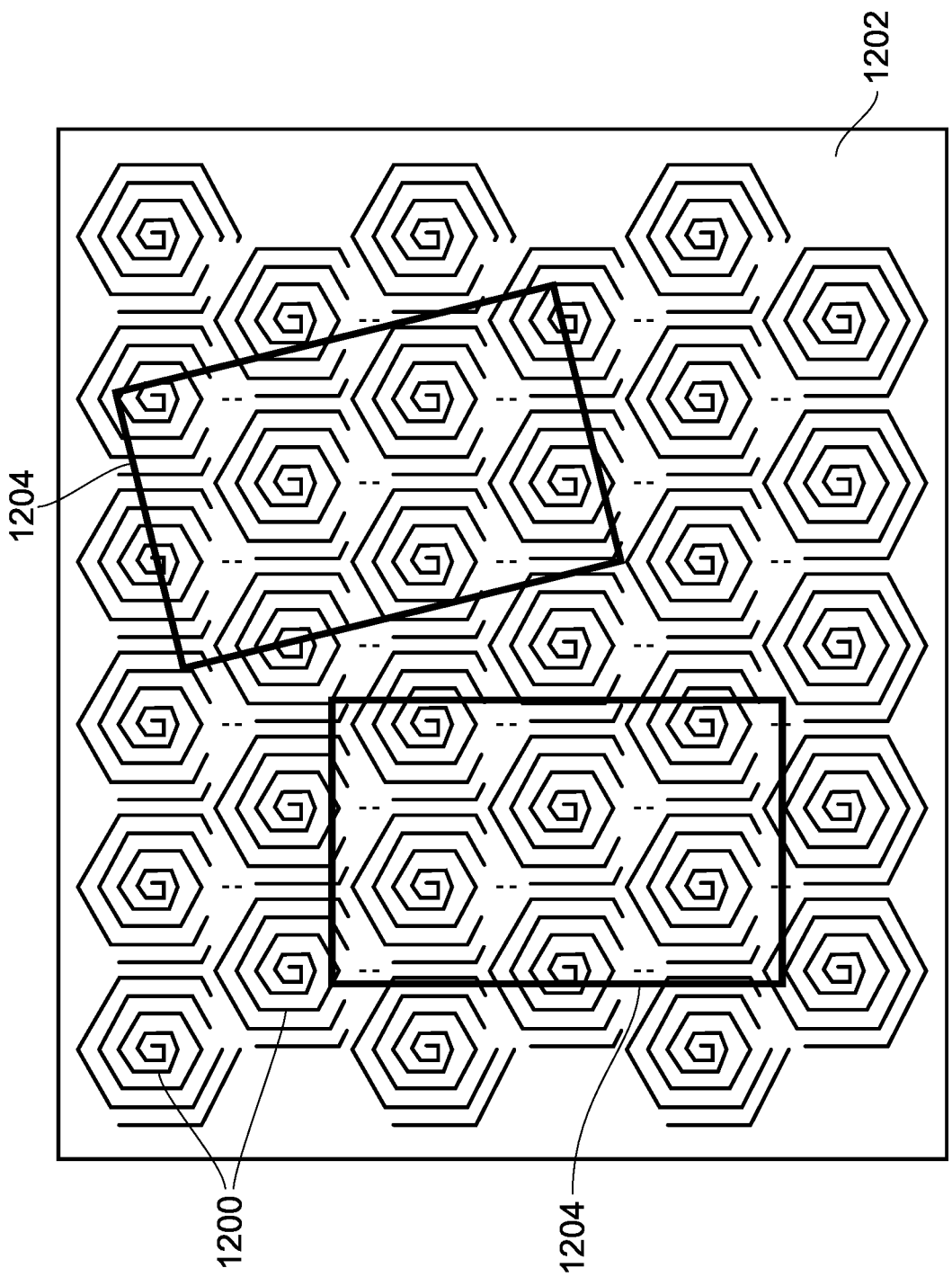
Figure 26:
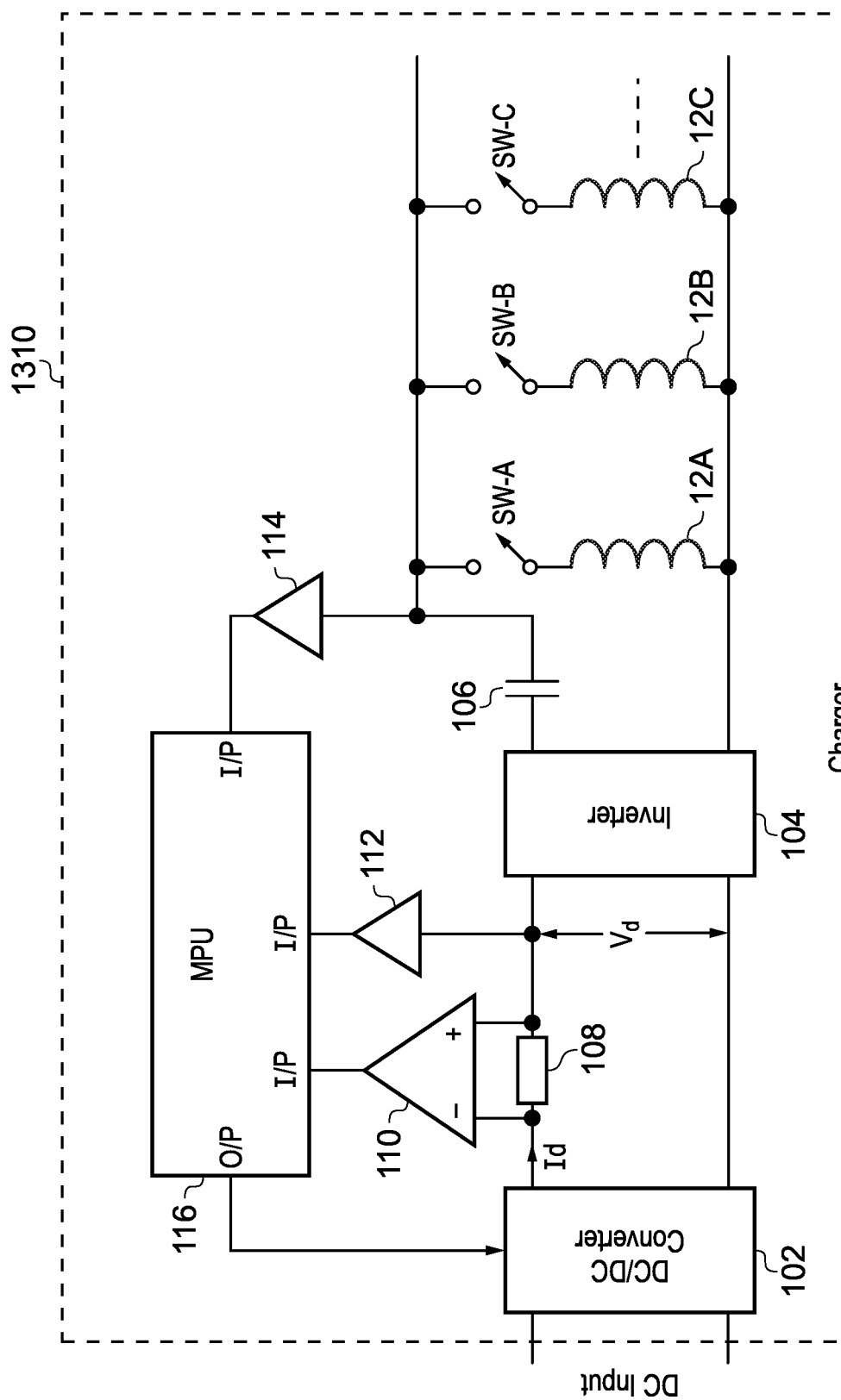

FIGS. 5(A) to 5(E) illustrate the conditions under which the modes of FIG. 4 are selected;

FIG. 6 is a schematic diagram of another system according to one embodiment of the present invention;

FIGS. 7(a) to 7(d) show equivalent circuits of a primary coil and resonant capacitor to show an effect that a foreign body may have on an equivalent circuit seen by a primary coil;

FIGS. 8(a) to 8(c) show a set of three graphs respectively showing waveforms for the voltage $V_d$, the current $I_d$, and the power drawn P;

FIGS. 9(a) to 9(c), 10(a) to 10(c) and 11(a) to 11(c) show graphs similar to those shown in FIGS. 8(a) to 8(c);

FIG. 12 is an enlarged version of FIG. 8(a), intended to provide an example as to when measurements could be taken;

FIGS. 13(a) to 13(c) show timing diagrams for the FIG. 6 system under different conditions;

FIG. 14 is a flow diagram of another method according to one embodiment of the present invention;

FIG. 15 is a schematic diagram of another system according to one embodiment of the present invention;

FIG. 16 shows a typical current and voltage profile for charging a Lithium Ion battery;

FIG. 17 is a schematic diagram of a secondary unit which may be substituted for the secondary unit in the systems;

FIGS. 18 and 19 are schematic diagrams of further secondary units;

FIG. 20 is a schematic diagram of another primary unit according to one embodiment of the present invention;

FIGS. 21 to 23 are schematic diagrams of primary units 810, 910 and 1010, respectively;

FIGS. 24 and 25 are schematic diagrams of possible coil layouts on the charging surfaces of primary units according to some embodiments of the present invention; and FIG. 26 is a schematic diagram of a primary unit according to one embodiment of the present invention.

Figure 1:
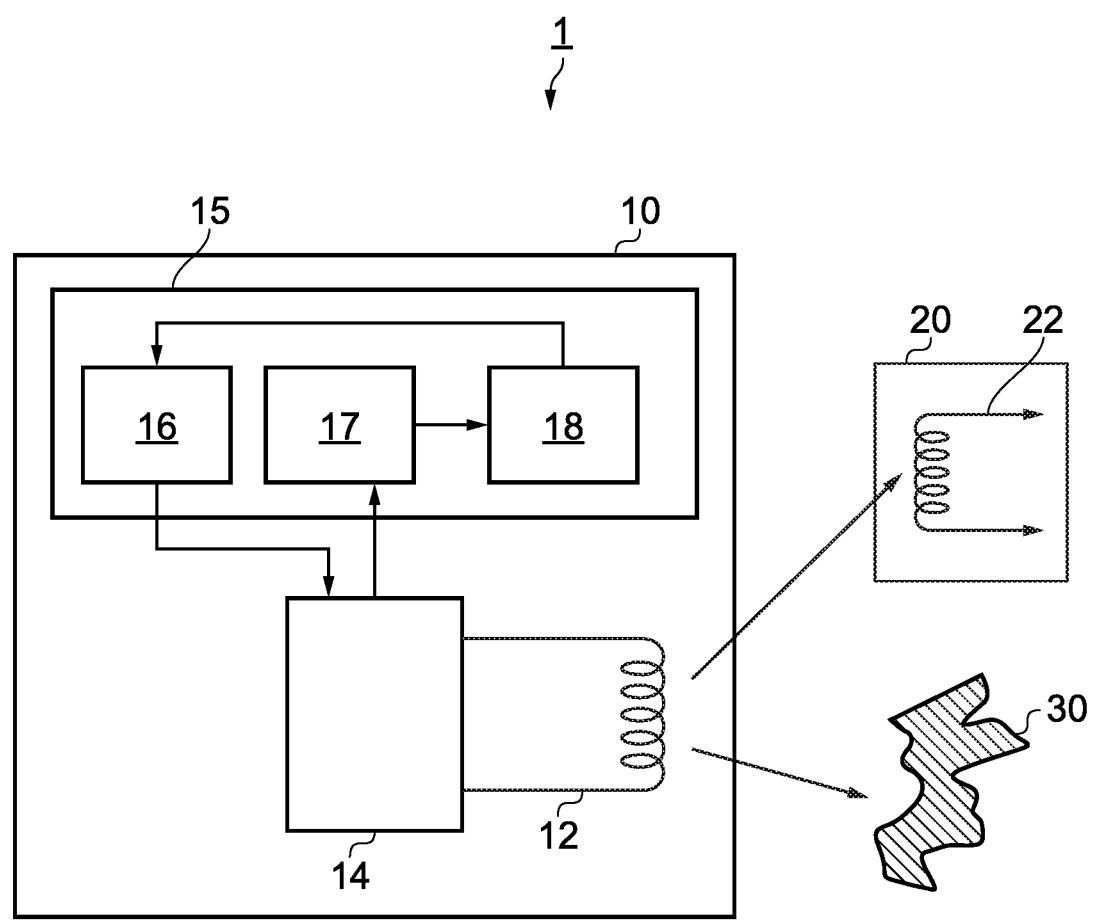
FIG. 1 is a schematic diagram of elements of an inductive power transfer system according to one embodiment of the present invention.

FIG. 1 is a schematic diagram of elements of an inductive power transfer system 1 according to one embodiment of the present invention. The system 1 includes a primary unit 10 and at least one secondary unit 20. The primary unit 10 itself also embodies the present invention.

The primary unit 10 includes a primary coil 12 and an electrical drive unit 14 connected to the primary coil 12 for applying electrical drive signals thereto, so as to generate an electromagnetic field. A control unit 15 is connected to the electrical drive unit 14, and includes an adjustment unit 16, an assessment unit 17 and a detection unit 18.

The adjustment unit 16 is connected to the electrical drive unit 14 to adjust or control the electrical drive signals, or at least one electrical drive signal, applied to the primary coil 12. The assessment unit 17 is connected to the electrical drive unit 14 to assess the amount of power drawn from the primary coil via the generated electromagnetic field. The detection unit 18 is connected to the assessment unit 17, to detect, in dependence upon the assessment made by the assessment unit 17, the presence of entities in proximity to the primary unit, as discussed further below.

The detection unit 18 is optionally connected to the adjustment unit 16 to enable the electrical drive signals applied to the primary coil 12 to be controlled in dependence upon the detection. For example, the mode of operation of the primary unit 10 could be controlled in dependence upon the detection, for example to place the primary unit 10 into one of "charging", "standby" and "shutdown" modes of operation.

As mentioned above, the primary unit 10 is configured to generate an electromagnetic field, and this field may be induced (as a horizontal or vertical field, relative to a charging surface or power transfer surface of the primary unit) in proximity to the primary coil 12. This electromagnetic field is employed in the system 1 to transfer power to one or more secondary units requiring power 20 located in proximity to the primary unit 10, and/or adversely to one or more foreign objects 30 also located in such proximity. A piece of metal may be considered to be such a foreign object. Such foreign objects (as mentioned above) may be considered to be substantial 'parasitic loads'.

The primary unit 10 may have any suitable form, for example having a flat platform forming a power transfer surface on or in proximity to which the or each secondary unit 20 can be placed. In one case, the electromagnetic field may be distributed over a power transfer area of the surface, as described in GB-A-2388716, the entire contents of which are incorporated herein by reference. It will be appreciated that this form of primary unit may allow one or more secondary units 20 and one or more foreign objects 30 to be simultaneously located in proximity to the primary unit to receive power therefrom. It will be appreciated that many other forms of primary unit 10 may allow one or more secondary units 20 and one or more foreign objects 30 to be simultaneously located in proximity to the primary unit to receive power therefrom. Another possible form for primary unit 10 is a shelf, on which the secondary unit 20 can be placed to receive power. Such a form may be advantageous for allowing parts of the secondary device to sit outside the magnetic field.

The secondary unit 20 is separable from the primary unit 10 and includes a secondary coil 22 which couples with the electromagnetic field generated by the primary unit 10 when the secondary unit 20 is in proximity to the primary unit 10. In this way, power can be transferred inductively from the primary unit 10 to the secondary unit 20 without requiring direct electrically-conductive connections therebetween.

The primary coil 12 and the or each secondary coil 22 may have any suitable forms, but may for example be copper wire wound around a high-permeability former, such as ferrite or amorphous metal. Litz wire is a special type of wire which may be used in these circumstances. Litz wire has many strands of wire twisted together and can help reduce skin and proximity effects. The primary and secondary coils 12, 22 may be different from one another, for example in size, number of turns, type of core, and physical layout etc. Multiple primary and secondary coils may be employed. The number of primary and secondary coils may be different from one another.

The secondary unit 20 may be connected to an external load (not shown—also referred to herein as the "actual load" of the secondary unit), and may be configured to supply inductively-received power to the external load. The secondary unit 20 may be carried in or by an object requiring power (secondary device), such as a portable electrical or electronic device or a rechargeable battery or cell. Further information regarding possible designs of secondary unit 20 and the objects (secondary devices) that can be powered by the secondary unit 20 can be found in GB-A-2388716 (referred to above). In GB-A-2388716, such secondary units may be referred to as secondary devices.

In the context of the present invention, secondary units (and/or secondary devices including such units) may be considered to be any electrical or electronic devices which require power, and may be portable such devices, for example (i.e. not exclusively) mobile phones, PDAs (Personal Digital Assistants), laptop computers, personal stereo equipment, MP3 players and the like, wireless headsets, vehicle charging units, home appliances such as kitchen appliances, personal cards such as credit cards, and wireless tags useful for tracking merchandise.

In use, the primary unit 10 may enter a measurement phase, during which the adjustment unit 16 acts to drive the unit so that the magnitude of an electrical drive signal supplied to one or more primary coils of the primary unit changes, e.g. from a first value (characterising the signal) to a second value (characterising the signal). Such driving may be considered to change the amount of power that would be drawn from the primary unit by a predetermined purely-resistive load, or an unregulated load, or a test unit including substantially only a purely-resistive load, in proximity thereto. The assessment unit 17 assesses the effect of such a change on a level of power being drawn from the primary unit. Such power may, in general terms, be drawn by a secondary unit 20 and/or a foreign object 30, although losses in so-called "friendly" parasitic loads (as discussed further below) may also need to be taken into account. The detection unit 18 may detect the presence of a secondary unit 20 and/or a foreign object 30 in proximity to the primary unit based upon the assessment made in the assessment unit 17.

If a foreign object 30 is detected, the primary unit 10 may enter a shutdown mode. If no such foreign object 30 is detected, the primary unit 10 may enter (or remain in) a charging mode if a secondary unit 20 requiring power is detected, or a standby mode if no such secondary unit 20 requiring power is detected. The standby mode may be entered for example if a secondary unit 20 is present but does not require power.

Embodiments of the present invention may be considered to operate based upon the following concept. In one embodiment, the secondary units 20 are configured to have a known power-requirement characteristic in response to the change effected by the adjustment unit 16 of the primary unit 10. In another embodiment, the secondary units 20 are regulated to draw a substantially constant amount of power (this being a preferred such power-requirement characteristic) from the primary unit 10 despite the change effected by the adjustment unit 16. In contrast, a foreign object is generally an unregulated load and the power drawn by the foreign object 30 may therefore change in correspondence with the change effected by the adjustment unit 16. So long as the power-requirement characteristic of the secondary unit 20 (i.e. to have substantially constant power drawn, or some other such characteristic) is substantially different from that of the foreign object, the primary unit 10 may detect the presence of secondary units 20 and/or foreign objects 30 in the detection unit 18 by assessing the power drawn from the primary unit in the assessment unit 17.

Figure 2:
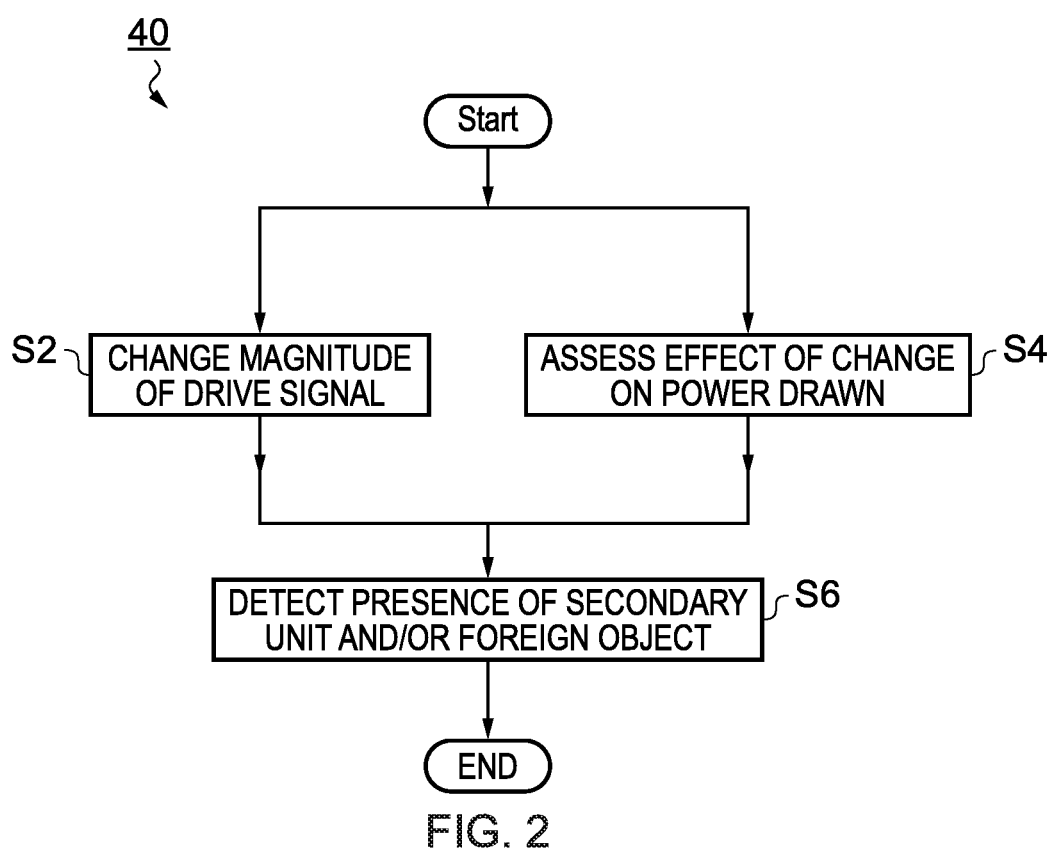
FIG. 2 is a flow chart representing a method according to one embodiment of the present invention.

FIG. 2 is a flow chart representing a method 40 according to one embodiment of the present invention. Method 40 may be carried out within the primary unit 10. Method 40 includes steps S2, S4 and S6.

Steps S2 and S4 are effectively carried out at the same time, or generally in parallel. In step S2, the magnitude of an electrical drive signal supplied to one or more primary coils of the primary unit 10 is changed. This may be carried out by the adjustment/control unit 16. In step S4, the effect of the change on the power drawn from the primary unit is assessed. This may be carried out by the assessment unit 17.

Step S6 is carried out after steps S2 and S4. In step S6, the presence of a secondary unit 20 and/or foreign object 30 is detected based on the assessed effect determined in step S4. This may be carried out by the detection unit 18.

Although not shown in FIG. 2, following the detection of step S6 the primary unit may be placed into the charging, standby or shutdown mode of operation.

Figure 3:
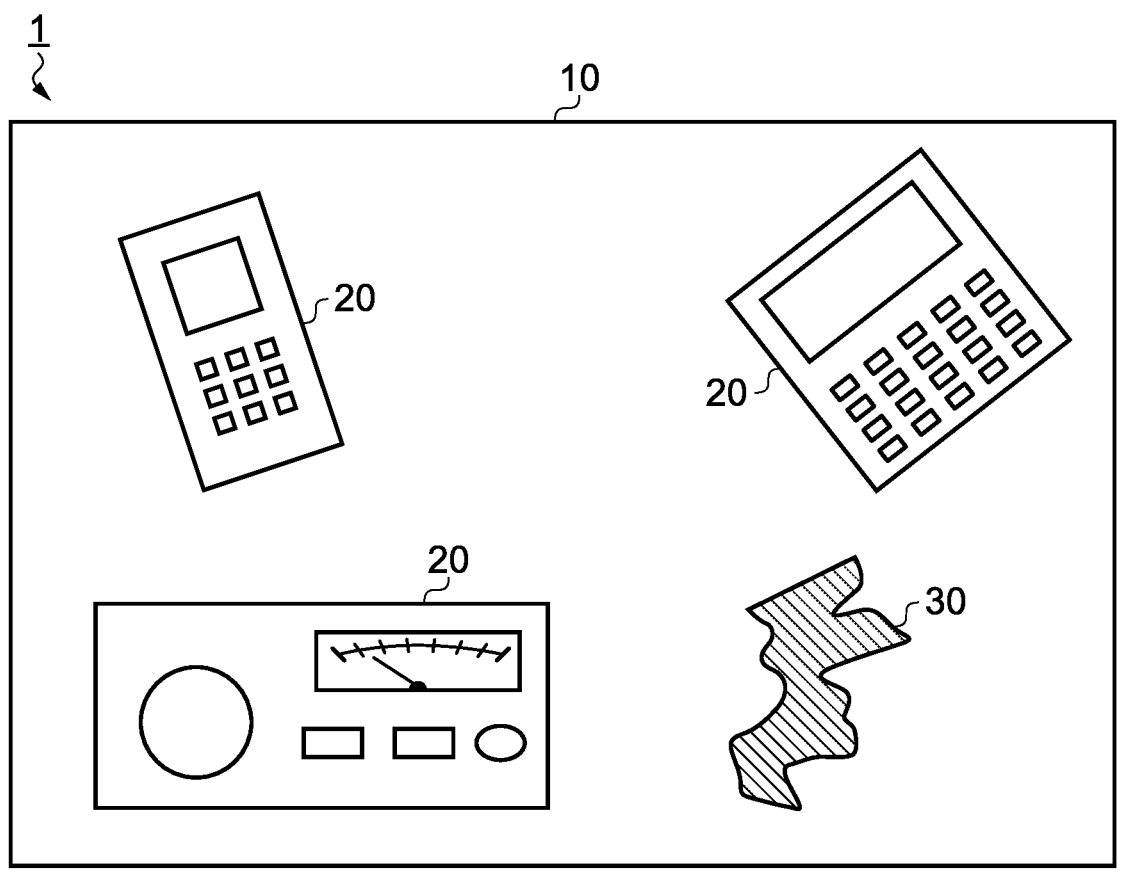
FIG. 3 is a another schematic diagram of the FIG. 1 system.

As mentioned above, the primary unit 10 may take the form of a flat panel or other form enabling, for example, multiple secondary units 20 to receive power therefrom simultaneously. Such a form could enable a single secondary unit 20 to receive power from a number of different positions or orientations relative to the primary unit 10. The reader is directed to GB-A-2388716 for an example of how to build such a form of primary unit. FIG. 3 is a schematic diagram of system 1 as seen from above, indicating this possibility. Primary unit 10 has three secondary units 20 (shown incorporated in portable electrical/electronic devices) resting on its power transfer surface for receiving power inductively therefrom. The three secondary units 20 are shown being of different types/kinds (and/or incorporated in devices of different types/kinds), but they may be the same as one another. The primary unit 10 also has a foreign object 30 resting on its power transfer surface, which could be a metal object such as a set of keys. In this case, the detection of the foreign object 30 may cause the primary unit to enter the shutdown mode.

In the standby and shutdown modes, the supply of power by induction from the primary unit may be restricted or stopped to save power and/or prevent a foreign object from heating up. The primary unit may remain in shutdown mode until it is reset in some way. Such a reset could be manually initiated by a user of the primary unit 10, or alternatively the control unit 15 could periodically, or from time to time, start to supply inductive power again and carry out a measurement phase by repeating the steps of method 40 of FIG. 2. That is, from time to time, measurement phases may be carried out to determine whether the foreign object 30 has been removed from proximity to the primary unit 10. These measurement phases may also detect whether secondary units 20 requiring power are present or not.

FIG. 4 is a schematic diagram illustrating different modes of operation in system 1 and the conditions for switching between these different modes. The three modes of operation shown are an operating mode (or a charging mode) 60, a shutdown mode 62 and a standby mode 64. It will be appreciated that in one embodiment other modes of operation may exist, such as a "configuration" mode.

In the operating mode 60, primary unit 10 is in the charging state (i.e. supplying inductive power) most of the time, but periodically enters a measurement phase 66, 68 as described above. If the result of the measurement phase 66 is that it is determined that no secondary unit 20 requires power, the primary unit 10 goes into the standby mode 64. If the result of the measurement phase 68 is that it is determined that a significant parasitic load (i.e. a foreign object 30) is present, the primary unit 10 goes into the shutdown mode 62.

In the standby mode 64, the electrical drive unit 14 is stopped for most of the time, thus consuming little power. Periodically, or from time to time, the primary unit 10 enters the charging state (i.e. to supply power inductively) and carries out a measurement phase 70, 72 to check whether it should enter either the operating mode 60 or the shutdown mode 62. Otherwise, it remains in the standby mode 64.

The shutdown mode is functionally identical to the standby mode, with corresponding measurement phases 74, 76. However, the two modes may be distinguished by some user-interface features such as an LED to prompt the user to remove any substantial parasitic load (i.e. a foreign object 30).

Figure 5A:
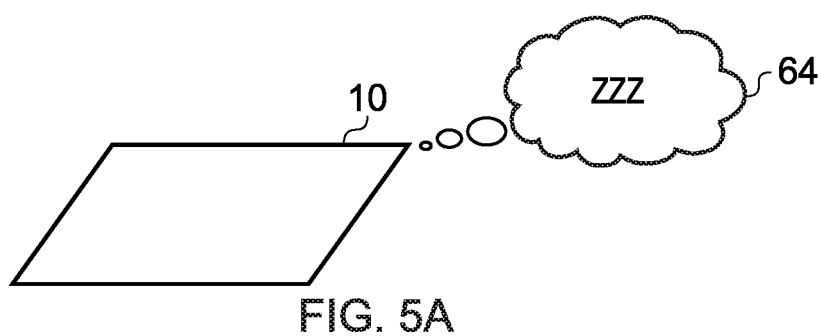
Figure 5B:
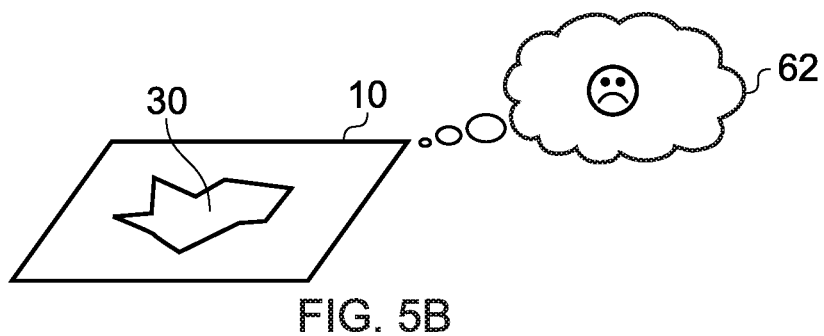
Figure 5C:
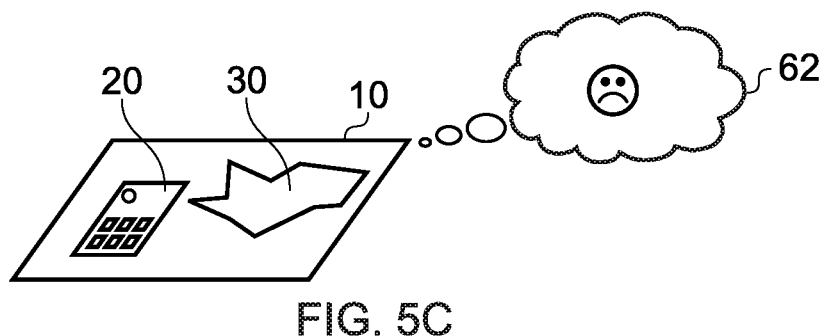
Figure 5D:
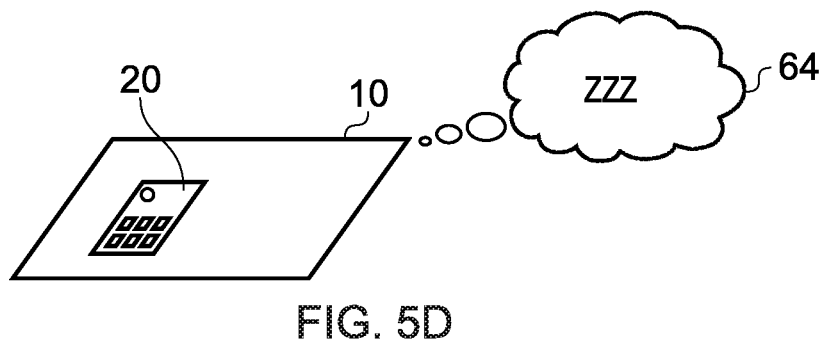
Figure 5E:
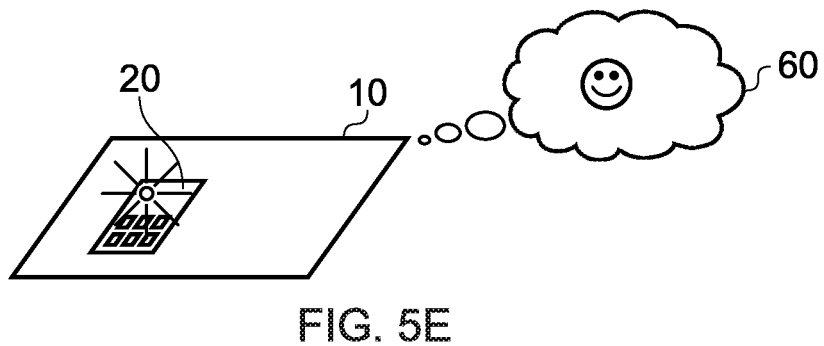

FIGS. 5(A) to 5(E) illustrate the conditions under which the modes of FIG. 4 are selected in system 1. In FIG. 5(A) there is no secondary unit 20 present in the vicinity of the primary unit 10. In this case, the primary unit 10 is in the standby mode 64. In FIG. 5(B), no secondary unit 20 is present but a substantial parasitic load (i.e. a foreign object 30) is present in the vicinity of the primary unit 10. In this case, the primary unit 10 is in the shutdown mode 62. In FIG. 5(C) a secondary unit 20 and a substantially parasitic load are both present at the same time in the vicinity of the primary unit 10. In this case, the primary unit is in the shutdown mode 62. In FIG. 5(D), a secondary unit 20 is present in the vicinity of the primary unit 10, but the load (the actual load) connected to the secondary unit 20 does not require any power at the current time. In this case, the primary unit 10 is in the standby mode 64. Finally, in FIG. 5(E), a secondary unit 20 is present and its load requires power to charge or operate. Thus, the primary unit 10 is in the operating mode 60.

FIG. 6 is a schematic diagram of a system 100 according to one embodiment of the present invention. System 100 may be considered to be equivalent to system 1 of FIG. 1, and accordingly includes a primary unit 10 having a primary coil 12, and a secondary unit 20 having a secondary coil 22. Power is transferred by electromagnetic induction from the primary coil 12 to the secondary coil 22 in substantially the same way as explained above in reference to system 1.

Although not shown in FIG. 6, it will be appreciated that system 100 may include a plurality of secondary units 20 and that those secondary units 20 may receive inductive power simultaneously from the primary unit 10. Furthermore, a foreign object 30 (also not shown in FIG. 6) may be present at the same time as such secondary units 20.

Primary unit 10 of system 100 includes, in addition to the primary coil 12, a DC/DC converter 102, an inverter 104, a capacitor 106, a resistor 108, a differential amplifier 110, buffers 112 and 114, and a microprocessor unit (MPU) 116. The secondary unit 20 of system 100 includes, in addition to the secondary coil 22, a rectifier 118, a DC/DC converter 120, a load 122, a capacitor 124 and a differential amplifier 126. Buffer 114 may be considered to be a peak detector, and is employed to measure the peak voltage over the coil 12.

It will be appreciated from FIG. 6 that the secondary unit 20 is shown incorporated within a portable device, being an object requiring power. For simplicity, the portable device is shown as being the same as the secondary unit 20, however the secondary unit 20 may be a component (for example removable) part of the portable device. Load 122 may therefore be considered to be the actual load of the secondary unit 20, although it could be separate from the secondary unit 20. The primary unit 10 of system 100 is shown as being a charger, operable to charge the portable device 20 by electromagnetic induction.

Within the primary unit 10 of the system 100, the DC/DC converter 102 is connected to receive an external DC input, and is operable to down-convert the received DC input to a lower DC voltage $V_d$. The DC/DC converter 102 may be a switch-mode buck converter for high efficiency. The DC/DC converter 102 is connected to drive the inverter 104, which generates an AC voltage at its output. The inverter 104 may be a MOSFET half-bridge, driven from a reference oscillator (not shown).

The AC voltage output by the inverter 104 is used to drive the primary inductive coil 12. The capacitor 106 is connected in series with the primary coil 12, and the coil/capacitor combination is configured such that it is resonant at the operating frequency of the inverter 104. In order to reduce the harmonics present in the electrical drive signals driving the primary coil (i.e. the output of the inverter 104), it may be desirable to provide an LC ballast circuit (not shown) between the inverter 104 and the primary coil 12. The peak coil voltage of the primary coil 12, $V_{pc}$, is typically much larger than the DC voltage $V_d$ because the circuitry following the inverter (i.e. including primary coil 12 and capacitor 106) is configured to be resonant.

In the present embodiment, the operating frequency is considered constant and is thus not further commented upon. However, the operating frequency could of course be variable (i.e. tuneable) for efficiency reasons. Indeed, the frequency could be tuned as a way of regulating the coil voltage (i.e. the magnitude of the electrical drive signals in the coil). For example, if the primary coil is configured to be resonant, then it is possible to vary the magnitude of the drive signals by varying the frequency.

In the secondary unit 20 (portable device) of system 100, the secondary coil 22 is connected to the input of the rectifier 118 in series with capacitor 124, again such that the coil/capacitor combination is resonant. In use, the secondary coil 22 presents the rectifier with an AC voltage received via electromagnetic induction from the primary coil 12. The rectifier 118 rectifies this AC voltage to output a DC voltage to the DC/DC converter 120. The DC/DC converter 120 down-converts the rectified voltage from the coil to match the input voltage required by the load 122.

DC/DC converter 120 may be a switch-mode converter (similarly to converter 102) rather than a linear converter. A switch-mode converter is generally able to convert from one DC voltage to another DC voltage far more efficiently than a linear converter. Furthermore, there is typically less variation in efficiency with input voltage for a switch-mode converter than for a linear converter. A linear converter drops any excess voltage across a resistance. Therefore, the larger the difference between the input and output voltages, the lower the efficiency. This variation in efficiency with input voltage can render the power drawn by the secondary unit 20 of the system 100 not independent of input voltage, which may make implementation of the present invention more difficult.

The DC/DC converter 120 of the secondary unit 20 is, optionally, configured to deliver a constant voltage to the load 122. This constant voltage is maintained by means of a feedback loop including the differential amplifier 126. Essentially, the output voltage of the DC/DC converter 120 is used to control the duty cycle of the DC/DC converter 120 in order to maintain the required input voltage, $V_{load}$, of the load 122 irrespective of changes to the input voltage of the DC/DC converter 120.

Over time, the voltage requirements of the load 122 may change, e.g. if the load 122 is a battery having a charging cycle. The DC/DC converter 120 may therefore be configured to maintain the required load voltage $V_{load}$ at different levels for the different parts of such a charging cycle. However, the required load voltage $V_{load}$ typically changes on a relatively slow timescale, such that over a particular measurement phase or set of measurement phases it appears to be relatively constant.

The primary unit 10 of system 100 regulates the primary coil voltage $V_{pc}$ at a predetermined voltage level. This is achieved by means of a feedback loop including the buffer (peak detector) 114 and the microprocessor unit 116. As shown in FIG. 6, the primary coil voltage is essentially buffered by buffer 114 and input to the microprocessor unit 116. Based upon the primary coil voltage, the microprocessor unit 116 may control the duty cycle of the DC/DC converter 102 in order to maintain the predetermined level of $V_{pc}$. The feedback may be a combination of analogue feedback for fast response and digital feedback via the microprocessor unit 116 for large dynamic range. The primary unit 10 is configured to maintain this predetermined primary coil voltage $V_{pc}$ irrespective of the load presented by the secondary unit 20 (and/or any other such secondary units 20 or foreign objects 30).

The primary unit 10 of the system 100 is also able to determine the amount of power drawn via the primary coil 12. In this embodiment, this is achieved by measuring both the voltage $V_d$ and the current drawn from the DC/DC converter 102, $I_d$. The voltage level $V_d$ is input to the microprocessor unit 116 via buffer 112, providing appropriate level-shifting and buffering. Resistor 108 is connected between the DC/DC converter 102 and the inverter 104 such that the current $I_d$ passes therethrough. This current $I_d$ is therefore measured by measuring the voltage across the resistor 108 with differential amplifier 110, and the output of the differential amplifier 110 is input to the microprocessor unit 116. Measuring the voltage and current at this point has the advantage that the signals are DC. Within the microprocessor unit 116, the voltages are sampled using analogue-to-digital converters (ADCs) and low-pass filtered to reduce noise. Averaging may be used as part of this filtering. The values of the voltage $V_d$ and the current $I_d$ are in the present embodiment determined within the microprocessor unit 116 and are multiplied together to determine the power drawn.

As mentioned above, when a metal object (i.e. a foreign object 30) is coupled to the electromagnetic field induced by the primary coil 12, electric eddy currents are induced in the surface of the metal. As these eddy currents are confined to the metal surface (determined by the skin depth), they have a reduced cross-section in which to circulate and therefore can be subjected to a relatively high AC resistance. The metal object therefore appears as a resistive load, the value of the resistance being dependent on the type of material, the geometry and the frequency of operation (i.e. the frequency of the AC current passing through the primary coil 12).

FIGS. 7(a) to 7(d) show equivalent circuits of the primary coil 12 and resonant capacitor 106, to show the effect that a foreign body 30 may have on the equivalent circuit seen by the primary coil 12.

Figure 7A:
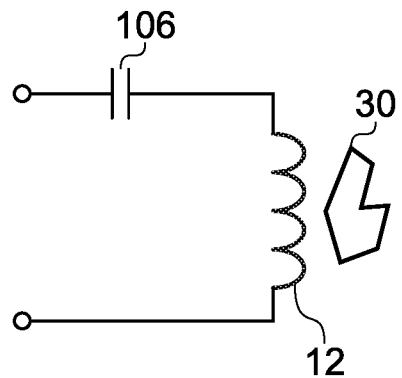

FIG. 7(a) shows the primary circuit with the primary coil 12 and resonant capacitor 106, with a foreign body 30 in close proximity. The foreign body is considered to be present in each of FIGS. 7(b) to 7(d) too, but is not shown for simplicity. In FIG. 7(a), the foreign body is considered to have no effect, i.e. as if it was absent. Accordingly, the equivalent circuit of FIG. 7(a) is the same as that in FIG. 6.

In a practical circuit, the inductor 12 and capacitor 106 will have parasitics, such that they are not a pure capacitance and inductance (e.g. capacitor electrical series resistance, inductor resistance and interwinding capacitance etc.).

Figure 7B:
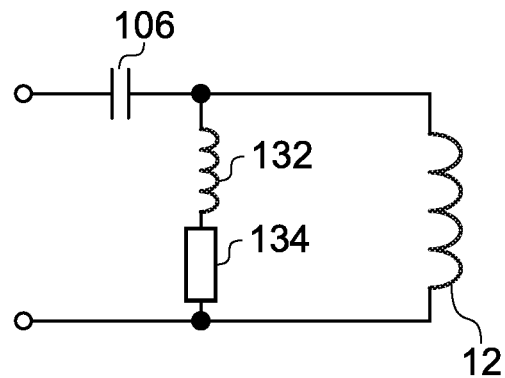

FIG. 7(b) shows the electrical equivalent circuit when the foreign body 30 is a conductor (e.g. copper or aluminium). Circulating eddy currents are induced in the body 30. These act to reduce the inductance. The metal will also have an AC resistance, depending on the thickness of the conductor, its resistivity and the frequency of the magnetic field. This will result in additional loss. The effect is as if a series combination of an inductance 132 and a resistance 134 were in parallel with the primary coil 12. A thick piece of copper as the foreign body 30 would have the dominant effect, for example at relatively low frequencies, of an inductance change. However, a thin piece of copper as the foreign body 30 would have the dominant effect of a resistance change.

Generally, the effect of a conductor is to reduce the inductance and increase the resonant frequency of the primary circuit. The losses will result in power being dissipated, and the foreign body 30 heating up. Very high temperatures can be attained, particularly if the body 30 is not that large and therefore unable to dissipate the heat effectively. Such metal present may therefore be seen as an increase in the power drawn from the supply.

Figure 7C:
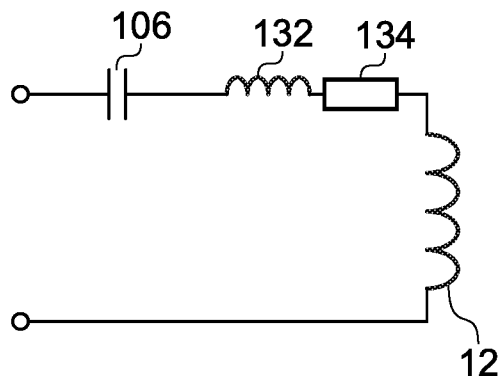

FIG. 7(c) shows the electrical equivalent circuit when a nonconductive or low conductive magnetic material is present (e.g. ferrite) as the foreign body 30. The presence of the magnetic material changes the reluctance of the overall magnetic circuit. This has the effect of increasing the effective inductance. However, losses will be introduced, which can be represented by a series resistance. The effect is as if a series combination of an inductance 132 and a resistance 134 were in series with the primary coil 12. Thus, the presence of a magnetic material will increase the inductance and lower the resonant frequency of the primary circuit. The resistance 134 present will introduce losses, which in turn will increase the power drawn from the supply.

Figure 7D:
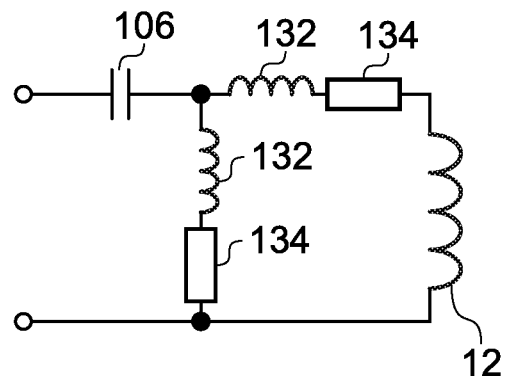

FIG. 7(d) shows the electrical equivalent circuit when there is a foreign body 30 present having both magnetic and conductive properties (for example silicon steel). The effect is as if a series combination of an inductance 132 and a resistance 134 were in parallel with the primary coil 12, and another such series combination were in series with the primary coil. Such a material may increase or decrease the inductance, depending upon its composition. Or alternatively, the inductance may be practically unchanged if the two inductance changes are similar. Thus, the resonant frequency may decrease, increase or remain the same. However, the resistance 134 present will introduce losses, which in turn will increase the power drawn from the supply.

Thus, examining a change in resonant frequency may not be a reliable indication of the presence of foreign objects. A view may be taken that magnetic materials as foreign bodies are unlikely to come into contact with the system. However, there is still the possibility that a conductive foreign body may be present at the same time as a legitimate secondary device. The legitimate secondary device would typically have either a coil wound around a magnetic core, or alternatively a planar coil with a magnetic shield behind it. The presence of the magnetic material associated with the device may increase the inductance, whilst the presence of the conductive foreign body may lower the inductance. Depending on the relative magnitudes there could be an increase, decrease or no change in inductance, but typically the inductance change of the legitimate device would dominate. It may be practically very difficult to isolate the effect of the foreign body to reliably detect it in this way.

FIGS. 8(a) to 8(c) show a set of three graphs respectively showing waveforms for the voltage $V_d$, the current $I_d$, and the power drawn P from the primary unit 10. The waveform for the power drawn P is obtained by multiplying the waveforms for the voltage $V_d$ and the current $I_d$. For FIGS. 8(a) to 8(c), it is assumed that a secondary unit 20 requiring power is in proximity to the primary unit 10, and that no foreign objects 30 are present.

For the majority of the time, the primary unit 10 is in a "normal" state, and provides a constant voltage $V_d$ to the input of the inverter 104. Periodically, or from time to time, a measurement phase is carried out. During this phase, the voltage level $V_d$ is changed, in this case by increasing it by around 10%. The state in which the voltage $V_d$ has been increased by 10% will be referred to as the "boost" state, and is identified as such in FIGS. 8(a) to 8(c). It may be appreciated from FIGS. 8(a) to 8(c) that a second change occurs as the voltage level $V_d$ returns from the boost state to the normal state. Accordingly, it could be considered that two measurement phases have occurred, however for the present purposes concentration will be placed on the first change, i.e. from the normal state to the boost state.

This measurement phase is used to check for the presence of foreign objects 30. In response to the increase in the voltage level $V_d$ during the boost state, the AC coil voltage $V_{pc}$ may also be boosted. As a result, the AC coil voltage in the secondary unit 20 will also increase and in turn the rectified DC voltage output by the rectifier 118 may increase too. However, as explained above, the DC/DC converter 120 in the secondary unit 20 may adapt via the feedback loop so as to continue to provide a constant voltage $V_{load}$ at the load 122. This in turn may mean that less current is drawn by the DC/DC converter 120 such that the total power drawn by the secondary coil 122 is approximately constant (neglecting relatively insignificant changes in efficiency with input voltage by both the rectifier 118 and the DC/DC converter 120). Accordingly, less current may be drawn by the primary coil 12 and therefore the current $I_d$ may also be reduced as shown in FIG. 8(b). Therefore, despite the voltage $V_d$ increasing in the boost state, there may be a corresponding reduction in the current $I_d$ such that the power drawn P from the DC/DC converter 102 in the primary unit 10 remains approximately constant, as shown in FIG. 8(c).

FIGS. 9(a) to 9(c) are similar to FIGS. 8(a) to 8(c), except that its graphs represent the case when there is a metal object (foreign object 30) in proximity to the primary coil 12, and in which no secondary units 20 requiring power are present. The primary unit 10 boosts the voltage level $V_d$ in the same way as in FIGS. 8(a) to 8(c), i.e. from the normal state to the boost state. However, in the present case, instead of there being a regulated load drawing constant power, there is a resistive load present equivalent to those shown in FIGS. 7(b) to 7(d). Such a resistive load has no regulation, and accordingly the current $I_d$ therefore also increases by approximately 10% as shown in FIG. 9(b) when the voltage $V_d$ increases, and accordingly the power drawn P increases by approximately 21%.

In a practical system there may be some non-linearity and this may need to be taken into account. For example, if diodes are employed in the rectifier 118 then the voltage dropped over those diodes will generally not change significantly, such that the efficiency of the rectifier increases at the higher voltage (i.e. at the boosted voltage). In addition, the efficiency of the DC/DC converter 120 in reality will change with the changing input voltage. It is therefore desirable to compare the power change in FIG. 9(c) to a threshold level, and require the power difference to be above this threshold to establish that a foreign object is present (assuming that a power difference below the threshold could be caused by such non-linearity).

FIGS. 10(a) to 10(c) and 11(a) to 11(c) are similar to FIGS. 8(a) to 8(c) and 9(a) to 9(c), except that it is now assumed that a secondary unit 20 requiring power and a piece of metal (foreign object 30) are both present at the same time. In this situation, the regulated load of the secondary unit 20 will result in a reduction in the current $I_d$ when the voltage $V_d$ is increased, but the metal (foreign object 30) will result in an increase in the current $I_d$ when the voltage $V_d$ is increased. FIGS. 10(a) to 10(c) show the case where the current change due to the secondary unit 20 is greater than that due to the metal, and FIG. 6 shows the case where the current change due to the metal is greater than that due to the secondary unit 20. It will be appreciated that because a piece of metal constitutes a resistive load without regulation, the power drawn P should increase if metal is present.

Based on the above, it will be appreciated that by assessing the change in the power drawn P when the voltage level $V_d$ is changed, it is possible to determine whether a secondary unit 20 requiring power and/or a foreign object 30 is present in proximity to the primary unit 10. One example way of carrying out this assessment is to take a measurement before and after that change. FIG. 12 is an enlarged version of FIG. 8(a), intended to provide an example as to when such measurements could be taken. The power drawn P may be first measured in the normal state. Sufficient time S1 is allowed for the system to settle from any other events that may have occurred. During this time S1, the filters may be reset. The current $I_d$ and voltage $V_d$ may then be sampled over a measurement time interval, A, during the normal state, and an average or filtered value taken. As mentioned above, the power drawn P is calculated by multiplying the voltage $V_d$ and current $I_d$ values together. Next, the voltage level $V_d$ is increased by 10% into the boost state. After another settling period S2 from the previous measurements, the currents and voltages are again sampled and averaged/filtered during a second measurement time interval B. Again, the power drawn P in the boost state is calculated by multiplying the voltage and current values together.

Technically, it is possible in one embodiment just to measure the current (as the voltage is being controlled) to assess the power level. That is, it is to some extent redundant to measure the voltage and multiply the voltage by the current. In a simple form, the invention may be embodied by setting one voltage and measuring the current and then setting another voltage and measuring the current. That is, it is not essential to obtain a power value specifically, rather just a "measurement" or "indicator" of power level. The embodiments disclosed herein should therefore be interpreted accordingly.

If the power drawn P in the boost state exceeds that drawn in the normal state by a predetermined amount (for example, exceeding a threshold amount), then it may be determined that a foreign object is present in proximity to the primary unit. However, in one embodiment it is possible for the load in a secondary unit to change between the two measurements, for example if the charging cycle of a load 122 such as a battery changes from one zone to the next. It is therefore desirable to carry out two sets of measurements in succession. These sets may be considered to include different measurement phases or may be considered together to form a single measurement phase. If both sets of measurements are consistent, then it may be determined that a foreign object 30 is indeed present.

FIGS. 13(a) to 13(c) show timing diagrams for the system 100 under different conditions. FIG. 13(a) shows the system 100 in normal operation when there is a secondary unit 20 in proximity to the primary unit 10 and no foreign object 30 present. Periodically, or from time to time, the primary unit 10 checks to see if any foreign objects 30 are present by boosting the voltage level $V_d$ and making a set of two measurements, as described above. If the result of the two measurements is within a certain tolerance, then the system may deduce that no foreign object 30 is present and that it may not be necessary to take another set of measurements. The system then waits for a predetermined period before carrying out another set of such measurements. In the example shown in FIG. 13(a), there is an example period of 500 milliseconds between each set of such measurements, and the boost state is maintained for example periods of 10 milliseconds.

FIG. 13(b) shows the system when a foreign object 30 is detected. Here, the first measurement set is assumed to show a significant difference in power levels, so it is immediately followed by a second set of such measurements. If the two sets of measurements are consistent with one another, the system then reduces the power supply to zero, to prevent power from being delivered into the foreign object 30 and heating it. This may be considered to be equivalent to the system entering the shutdown mode as discussed above.

FIG. 13(c) shows the system when a foreign object 30 is present. It is therefore assumed that the system is in the shutdown mode, and that from time to time the system checks to see if the foreign object 30 has been removed. Accordingly, during most of the time, there is no voltage present (i.e. the voltage level $V_d$ is zero), in order to prevent the foreign object from heating up. Periodically, the voltage level $V_d$ is raised to the normal state before the measurements can be taken. If the foreign object 30 is still present, then the primary unit 10 will take two sets of measurements and then reduce the voltage level $V_d$ to zero again. However, if the foreign object 30 has been removed then the first set of power measurements will be substantially the same as one another and the normal operating state can be resumed. This may be considered to be equivalent to the system leaving the shutdown mode and entering the operating mode of operation.

It is possible in certain cases that the secondary-device load regulation will function if lower voltages (than the normal and boost-state voltages) are applied. In this case it may be possible to make measurements at two voltage levels which are both below (or one of which is below) that of the normal and boost states.

FIG. 14 is a flow diagram of a method 200 according to one embodiment of the present invention. Method 200 includes steps S200 to S244, and may be employed by system 100.

In step S200, the power (i.e. the voltage level $V_d$) is set to the 'normal' state, and the system is then allowed to settle in step S202, in this case for 10 ms. In step S204, the power drawn P is measured and stored as a value P1 in step S206. In step S208, a check is made to see if the power drawn, P1, is greater than a certain threshold power level, X. If the power drawn P1 is less than or equal to X, then it is assumed that there is no device requiring power and the power is turned off (i.e. the voltage level $V_d$ is set to zero) in step S210. If there are no secondary units requiring power, then the system will wait for a predetermined amount of time, in this case for 500 ms, in step S212 before returning to step S200 to see if a secondary unit has appeared. It may be that there is a secondary unit present (for example incorporated in a secondary device), but that the secondary unit does not require power, as considered below.

If in step S208 it is determined that the power drawn P1 is greater than X, then the power (i.e. the voltage level $V_d$) is raised to the 'Boost' state in step S214. The system is then allowed to settle in step S216, again for 10 ms. In step S218, the power drawn P is measured and stored as a value P2 in step S220. The power is then returned to the 'Normal' state in step S222.

In step S224, it is determined whether the difference between P2 and P1, i.e. P2−P1, is less than or equal to a given threshold, Y. If this is the case, the values P2 and P1 are considered to be substantially the same as one another and it is therefore assumed that there is no metal (i.e. no foreign object 30) present. In this case, the method leaves the power in the 'Normal' state and proceeds to step S212 in which the system will wait for a predetermined amount of time, in this case for 500 ms, before returning to step S200.

If P2−P1 is determined to be greater then the threshold Y, it may mean that there is metal (i.e. a foreign object 30) present, or it could mean that the actual load of a present secondary unit 20 has changed between the two measurements. In order to resolve this ambiguity, two more measurements are taken for each of the 'Normal' and 'Boost' states.

In this regard, the method proceeds to step S226 in which the system is allowed to settle in the 'Normal' state, in this case for 10 ms. In step S228, the power drawn P is measured and stored as a value P3 in step S230. In step S232, the power (i.e. the voltage level $V_d$) is then raised to the 'Boost' state, and the system is then allowed to settle in step S234, again for 10 ms. In step S236, the power drawn P is measured and stored as a value P4 in step S238. The power is then returned to the 'Normal' state in step S240.

In step S242, it is determined whether the difference between P4 and P3, i.e. P4−P3, is less than or equal to threshold, Y. This is similar to the determination made in step S224, and accordingly it will be appreciated that in this way the second set of measurements (P3, P4) can be compared the first set of measurements (P1, P2).

If the second set of measurements also indicates a difference greater than Y, then the system determines that metal (i.e. a foreign object 30) is present and sets the power to 'Off' by proceeding to step S210. Otherwise, the method leaves the power in the 'Normal' state and proceeds to step S212 in which the system will wait for a predetermined amount of time, in this case for 500 ms, before returning to step S200. By returning to step S200, the system checks again to see if there has been any change (e.g. some metal placed in proximity to the charger coil).

The threshold level Y needs to be large enough to accommodate any error due to noise present and any uncertainty in the system. It may be possible to reduce the uncertainty which will allow lower levels of parasitic loss to be detected.

The losses in the system may be apportioned as:
1. Fixed pad losses (i.e. in the primary unit 10)
2. Variable pad losses (i.e. in the primary unit 10)
3. Fixed receiver losses (i.e. in the secondary unit 20, or in the secondary device)
4. Variable receiver losses (i.e. in the secondary unit 20, or in the secondary device)
5. Load (i.e. in the actual load 122)
6. 'Parasitic' losses (e.g. in foreign metal objects)
7. 'Friendly Parasitic' losses (e.g. in metal present within the secondary unit or device)

The fixed losses (1,3) should remain the same between measurements, irrespective of being in the 'Normal' or 'Boost' states. The load should also remain the same between measurements (a second set of measurements is used to cope with the case that the load changes significantly between measurements). The variable losses (2,4) add measurement uncertainty. It may be possible to compensate for this uncertainty by calibrating the system for efficiency against coil voltage. The resulting measurement will detect a combination of 'Parasitic' and 'Friendly Parasitic' losses (6,7). It may be possible to determine the 'Friendly Parasitics' (7) to reduce the uncertainty. For instance, the portable device (secondary unit 20 or secondary device incorporating the secondary unit 20) may communicate what its 'Friendly Parasitics' are to the charger (primary unit 10) on start-up (or it may communicate a code such as a device type which represents this information). Accordingly, by employing such additional information it may be possible to improve the accuracy and robustness of the system.

FIG. 15 is a schematic diagram of a system 300 according to one embodiment of the present invention. System 300 may be considered to be equivalent to systems 1 and 100, and accordingly includes a primary unit 10 having a primary coil 12, and a secondary unit 20 having a secondary coil 22. Power is transferred by electromagnetic induction from the primary coil 12 to the secondary coil 22 in substantially the same way as explained above in reference to system 1.

Although not shown in FIG. 15, it will be appreciated that system 300 may include a plurality of secondary units 20 and that those secondary units 20 may receive inductive power simultaneously from the primary unit 10. Furthermore, a foreign object 30 (also not shown in FIG. 6) may be present at the same time as such secondary units 20.

System 300 is closely similar to system 100, and accordingly the same reference numerals are employed for simplicity and duplicate description is omitted. System 300 differs from system 100 in that the power drawn P is determined by measuring the voltage and current at the primary coil 12. This has the advantage that the measurement is more accurate because it is directly at the primary coil 12, rather than at the input to the inverter 104 as in system 100. However, system 300 may be less advantageous than system 100 because i) the voltage and current measured at the primary coil 12 are AC and therefore may be harder to determine, particularly if the waveforms are distorted; ii) it may be desirable to determine the phase angle between the voltage and current to establish power drawn as distinct from energy stored in the resonant circuit including the primary coil 12 and capacitor 106; iii) the voltage is much higher at the primary coil 12 than at the input to the inverter 104.

In system 300, the voltage at the primary coil 12 is measured with a peak detector (implemented by buffer 114) and the current is measured with a current transformer/sensor 302 (via a buffer 312). Equally, the current could be measured using a series sense resistor, as in system 100. In order to determine the power drawn P by the coil 12, the microprocessor unit 316 (equivalent to microprocessor unit 116 in system 100) measures the rms AC voltage, $V_{ac}$ (equivalent to voltage $V_{pc}$) across the primary coil 12, measures the rms AC current, $I_{ac}$, passing through the primary coil 12, and determines the phase difference $\Phi$ between them. The power drawn is then given by $P = V_{ac} I_{ac} |\cos \Phi|$. In measuring the AC current and voltage, it may be desirable to use a lock-in amplifier (either digital within the microprocessor 316 or analogue external to it). This may use the reference oscillator used in the inverter 104 to 'lock-in' on the required signal and dramatically improve the signal-to-noise ratio (SNR).

Looking at systems 100 and 300, it is possible in other embodiments to measure the voltage and current desirable for determining the power drawn P at various other points in those systems, for example at the input to the DC/DC converter 102.

In the above embodiments, the main configuration considered is that of supplying a constant voltage to load 122. However, it may be possible in other embodiments to charge a battery directly. FIG. 16 shows a typical current and voltage profile for charging a Lithium Ion battery (the profiles for Lithium Polymer batteries and other derivatives are similar). Initially, if the battery is significantly discharged, constant current is supplied at a low level (at around 10% of maximum), and this is commonly referred to as trickle charging. This continues until the battery reaches around 3V. After this point, constant current is supplied at the maximum level until the battery reaches 4.2V. At this point, the output voltage is regulated to 4.2V and the current gradually reduces until the charging current is around 7% of maximum. Thus both constant current regulation and constant voltage regulation may be employed at different points during the charge cycle.

FIG. 17 is a schematic diagram of a secondary unit 420 which may be substituted for the secondary unit 20 in systems 1, 100 and 300 to form further embodiments of the present invention. Accordingly, those elements in secondary unit 420 already described above with reference to secondary unit 20 are denoted by the same reference numerals and duplicate description is omitted.

Secondary unit 420 has a battery 422 as its actual load (i.e. in place of load 122). A charge controller 424 is disposed between the rectifier 118 and the battery 422, and includes a DC/DC converter 424, differential (or even operational) amplifiers 428, 430 and 432, and a resistor 434. The DC/DC converter 424 is connected between the rectifier 118 and the battery 422 in a similar way to the DC/DC converter 120 in secondary unit 20, i.e. to down-convert the voltage output by rectifier 118 for supply to the battery 422. The resistor 434 is connected between the DC/DC converter 426 and the battery 422 such that the current $I_{load}$ flowing into the battery passes therethrough. Differential amplifiers 428 and 430 are connected to measure this current as a voltage over the resistor 434 and input the measurement (current sense) of the current $I_{load}$ into the DC/DC converter 426. Operational amplifier 432 is connected to measure the voltage $V_{load}$ supplied to the battery 422, and to input this measurement (voltage sense) also to the DC/DC converter 426. Looking back to FIG. 16, during the constant voltage phase aim is to regulate the voltage, and during the constant current phase the aim is to regulate the current.

The output from both paths of differential (or operational) amplifiers 428, 430, 432 is used to control the duty-cycle of the DC/DC converter. Changing the duty cycle, changes the ratio of input voltage to output voltage. Equally, at a given instant in time, there will be some form of load on the output, so the DC/DC voltage output can be adjusted to give a required current. The secondary unit 420 could be considered to have a control unit which takes the output from both paths as inputs, and adjusts the duty cycle of the DC/DC converter accordingly. The control function may be embodied in many different ways, for example as an electronic chip including appropriate logic circuitry controlling MOSFETs.

Incidentally, it is noted that the DC/DC converters in any of the embodiments of the present invention could be upconvertors (Boost convertors) or up/down convertors (Buck-Boost convertors) instead of down convertors. However, down-convertors tend to be more efficient.

During the constant current phases, the current sense is primarily used to regulate the current $I_{load}$ to be constant. When the voltage $V_d$ in the primary unit 10 is increased, there will be a corresponding increase in the voltage over the receiver coil 22, and hence in the rectified voltage input to the DC/DC converter 426. With no feedback, both $V_{load}$ and $I_{load}$ would increase. However, the feedback from the current sense acts to ensure that the load current, $I_{load}$, remains constant. This results in the current in the receiver coil (secondary coil) 22 being reduced. Consequently, the current in the primary coil 12 is reduced. Thus the power drawn P by the primary coil should remain approximately the same, ignoring any change in efficiency with voltage level or other variable losses.

In both voltage regulation and current regulation modes, the power drawn by the charger controller 424 may be approximately independent of the voltage at the secondary coil 22. Any change in secondary coil voltage can be reflected in a change in secondary coil current. The power requirement of the charge controller 424 will vary over time, but this will be relatively slow compared to the measurements made during use of embodiments of the present invention described above. Accordingly, when the primary coil voltage is increased, there will be a corresponding decrease in primary coil current, such that the total power drawn P remains approximately the same.

It has been found that some charge controllers 424 have repeating spikes of current occurring during the trickle charge phase. If the period of these spikes happens to coincide with the period at which the measurements are made, then it can cause an erroneous result. This may be combated by taking three sets of measurements instead of two, and by ensuring that the time between the second and third set is sufficiently different to the time between the first and second sets.

It will be appreciated that the DC/DC converters 120, 426 need not operate under constant current or voltage conditions. The system will operate properly if the power drawn P by the secondary unit does not change (or changes predictably, i.e. in some predetermined manner) with input voltage across the secondary coil 22. This is irrespective of what voltage or current is supplied to the load 122, 422.

FIGS. 18 and 19 are schematic diagrams of secondary units 520 and 620, respectively configured to enable the system (further including a primary unit) to focus on regulation of the power drawn P, rather than specifically the voltage or current supplied to the load 122, 422. Secondary units 520 and 620 may be substituted for secondary units 20 and 420 to form further embodiments of the present invention.

Referring to FIG. 18, the secondary unit 520 includes (in addition to those elements denoted by the same reference numerals as in secondary unit 20 of FIG. 6) an operational amplifier 502, a resistor 504, a voltage sense point 505 and a control unit 506. As will be appreciated by comparison to FIG. 6, the operational amplifier 502, the resistor 504, and the voltage sense point 505 are connected to provide voltage and current measurements to the control unit 506, representative of the voltage and current input to DC/DC converter 120. The control unit 506 is operable to adjust the operation of the DC/DC converter 120 to modify the input current so that the overall power drawn P from the primary unit remains constant when the input voltage changes.

Referring to FIG. 19, the secondary unit 620 includes (in addition to those elements denoted by the same reference numerals as in secondary unit 20 of FIG. 6) an AC current sense point 602, a buffer 604, an AC voltage sense point 605 and a control unit 606. As will be appreciated by comparison to FIG. 15, the AC current sense point 602, buffer 604, and AC voltage sense point 605 are connected to provide AC voltage and current measurements to the control unit 606, representative of the AC voltage and current input to rectifier 118. The control unit 606 is operable to monitor the AC coil voltage and adjust the operation of the DC/DC converter 120 such that the overall power drawn P is independent of the (primary or secondary) coil voltage.

FIG. 20 is a schematic diagram of a primary unit 710 according to one embodiment of the present invention that is identical to primary unit 10 of FIG. 6, except that an LC ballast circuit 702 is present between the inverter 104 and the primary coil 12 and capacitor 106. Accordingly, those elements common between primary units 710 and 10 are denoted by the same reference numerals and duplicate description is omitted. LC ballast circuit 702 includes a series inductor 704 and a parallel capacitor 706, connected to form a low-pass filter. It is advantageous to provide the LC ballast circuit 702, as the low pass filtering has the result of reducing the harmonics from the inverter 104. This may be helpful as unwanted harmonics can cause interference in other equipment (e.g. radio receivers) or prevent the system from complying with regulatory emissions.

FIGS. 21 to 23 are schematic diagrams of primary units 810, 910 and 1010, respectively, each of which is closely similar to a primary unit described above and therefore forms a further embodiment of the present invention. Accordingly, those elements of primary units 810, 910 and 1010 already described above are denoted by the same reference numerals and duplicate description is omitted.

The common feature between primary units 810, 910 and 1010 is that they each have multiple primary coils 12A, 12B, 12C . . . , rather than a single primary coil 12. It is possible to employ multiple primary coils so that multiple secondary units (or secondary devices incorporating such secondary units) can be charged simultaneously. The primary coils 12A, 12B, 12C . . . are configured to be in parallel with one another. Multiple primary coils may be present for reasons other than for coping with multiple secondary units. For example, multiple primary coils may be provided for redundancy reasons, or so that a single secondary device can receive power in any of a number of locations (defined by the different primary coils) relative to the primary unit. Additionally, instead of effecting the change in power available by altering the voltage (or the magnitude of some other signal) supplied to a sole primary coil, it would be possible to switch from one primary coil operated at a first voltage to a second primary coil operated at a second voltage different from the first voltage. That is, the difference between "normal" and "boost" states may be effected by switching between primary coils, or by changing the number of primary coils that are active simultaneously, or changing the magnitudes of signals supplied to the various primary coils, or some combination of these methods.

Methods embodying the present invention described above may be used in the same manner when primary units 810, 910 and 1010 are employed, one difference being that there is a parallel combination of primary coils present rather than a single such primary coil. It will be appreciated that primary unit 810 is similar to primary unit 10 of FIG. 6, in which the power drawn P is measured before the inverter 104, and that primary unit 910 is similar to primary unit 10 of FIG. 15, in which the power is measured after the inverter 104.

In this arrangement, measurements may also be taken at the node before the resonant capacitor in order to reduce phase errors and improve power measurement accuracy. Rather than having a single current sense for all of the coils, it can be advantageous in one embodiment to have a current sense on each individual coil, as shown in FIG. 23. This can make it easier to deduce the total amount of power drawn, particularly where there are widely varying loads or in the case where some coils have devices being powered and other coils do not. The different primary coils may for example be distantly located from one another, although they may be relatively closely located together, for example in an array.

Incidentally, for AC current measurement, either a current transformer (a current sense), as in FIG. 22, or a sense resistor, as in FIG. 23, may be used. Either method can involve a peak detector or an averager for the measurement. One advantage of a current sense is that it introduces less loss than a resistor. However, a current sense is generally more expensive than a resistor. If there is a large array of coils, as in FIG. 23, then it would probably be cost-effective to use sense resistors.

FIGS. 24 and 25 are schematic diagrams of possible coil layouts on the charging surfaces of primary units of some embodiments of the present invention. In some such embodiments, a secondary unit may be placed anywhere, or substantially anywhere, on such charging surface to be charged. In each case shown, the primary unit concerned includes a plurality of primary coils. In FIG. 24, the charging surface has an array of wound ferrite cores 1100, i.e. an array of wound coils 1100 on a ferrite back-plate 1102. In FIG. 25, the charging surface has an array of printed hexagonal spiral coils 1200 etched onto a PCB (Printed Circuit Board) 1202, which may have a ferrite and/or metal shield underneath. In FIG. 25, each hexagonal arrangement 1200 may be considered to be an individual coil. Rectangles 1204 represent the possible footprints of a secondary unit, or a secondary device incorporating such a secondary unit, placed on the charging surface of the primary unit concerned to be charged (i.e. to receive power inductively therefrom). It will be appreciated that in one embodiment the footprint of the secondary unit may be smaller than the charging area on the charging surface, such that multiple secondary units may be charged at the same time.

Primary units embodying the present invention and having multiple primary coils 12A, 12B, 12C, . . . , may be configured to operate by supplying current to those primary coils for which there is a secondary coil 22 of a secondary unit in proximity thereto, and by supplying no current to other primary coils (so as to conserve power). The methods embodying the present invention described above may therefore be employed in such primary units. That is, it may be considered that there is an array of electrically-parallel primary coils, rather than just a single coil. However, in this case the primary unit may be configured such that each primary coil can be 'switched' in and out of circuit, so that only the appropriate coils are activated. FIG. 26 is a schematic diagram of such a primary unit 1310.

Primary unit 1310 is closely similar to primary unit 810 of FIG. 21 described above. Accordingly, those elements of primary unit 1310 already described above are denoted by the same reference numerals and duplicate description is omitted. Primary unit 810 includes switches SW-A, SW-B, SW-C, . . . , connected in series with primary coils 12A, 12B, 12C, . . . , respectively, and operable to switch their respective primary coils in and out of circuit. It may be appreciated that by analogy primary units equivalent to those shown in FIGS. 22 and 23 could also be implemented.

It may be desirable to ensure that the overall inductance remains the same to keep the system on resonance. This can be achieved by having separate inductors in the primary unit to be used as 'dummy coils'. Thus if fewer primary coils than the maximum are energised (switched into circuit), then a required number of additional 'dummy coils' may be switched into circuit to keep the overall inductance the same.

In some embodiments of the present invention, it is possible to employ many different types of DC/DC converter, including Buck Converters, Boost Converters and Buck-Boost Converters of many different topologies. It is possible for secondary units embodying the present invention to include loads (even multiple loads) that may be constant-current, constant-voltage loads, or some other combination of the two. For instance, a portable device (secondary device incorporating a secondary unit) may need power for its internal functionality in addition to that required by a charge controller to charge a battery.

In some embodiments of the present invention, it is not essential for the regulation performed in the secondary unit to be constant-current or constant-voltage. Systems embodying the present invention may operate if the power drawn P by the portable device does not change with input voltage (e.g. voltage $V_d$ in the primary unit). This is irrespective of what voltage or current is supplied to the load in the secondary unit. The regulation may not be constant-power either, and may be configured to have a known dependence of the power drawn P with respect to input voltage. In this situation, the primary unit (charger) may take power measurements at two primary coil voltage levels (constituting a measured power-requirement variation). Using knowledge of the coupling between the primary coil and secondary coil, the two corresponding secondary-coil voltages may thus be determined. Using knowledge of the power-requirement variation with input voltage of the secondary unit, the expected power-requirement variation for the two measurements may thus be determined. If the measured power-requirement variation is substantially different from (e.g. greater than) the expected power-requirement variation, then the charger deduces that there must be metal (i.e. a foreign object) present. It may be desirable for the receiver (secondary unit) to communicate information to the charger (primary unit) relating to the degree of coupling between the charger and receiver or to communicate the received voltage directly. It may be desirable to perform more than two measurements and to fit a polynomial. Other derived information (e.g. the derivative) may be used in determining whether there are foreign objects present.

Although the embodiments described above output DC voltages to a load, and consequently have a rectifier in the portable device (secondary unit), this does not have to be the case. For instance, it is possible to supply an AC voltage to the load. In this case, it would still be possible to implement the present invention, i.e. to ensure that the power drawn P by the secondary unit either remains constant or has a known dependence on input voltage in the absence of foreign objects.

Some embodiments of the present invention are advantageous because communications between the portable device (secondary unit) and the charger (primary unit) are not essential, i.e. are optional. Some embodiments of the present invention may thus be lower in cost than systems where communication is essential. Some embodiments of the present invention are able to detect metal (foreign objects) in the presence of a valid portable device (secondary unit). Some embodiments of the present invention are also not 'fooled' by steel or silicon steel, i.e. they can differentiate between secondary units and such foreign objects, because they do not rely on a phase/frequency shift measurement. Some embodiments of the present invention may also be cost-effective in terms of hardware as many aspects of the present invention can be implemented in software within a microprocessor.

In any of the above aspects of the present invention, particularly in the method aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A wireless power transmitter for use in an inductive power transfer system, the inductive power transfer system including at least one secondary unit, the wireless power transmitter being operable to transmit power wirelessly to one or more of a) the at least one secondary unit and b) a foreign object located in proximity to the wireless power transmitter, the at least one secondary unit including a regulator with an operating threshold, the wireless power transmitter comprising:
a primary coil configured to transmit power wirelessly to the at least one secondary unit;
processing circuitry configured to predetermine a rate for changing an electrical drive signal during a measurement phase;
driver circuitry operably coupled to said primary coil, said driver circuitry operable to drive said primary coil to transmit power sufficient to operate the regulator at or above the operating threshold, said driver circuitry operable to drive said primary coil so that, in the measurement phase, a magnitude of an electrical drive signal supplied to said primary coil changes from a first value by the predetermined rate to a second value, wherein power transmitted at said first value is sufficient to operate the regulator at or above the operating threshold and power transmitted at said second value is sufficient to operate the regulator at or above the operating threshold; and
sensor circuitry configured to sense an electrical characteristic of one or more of the driver circuitry and the primary coil, said sensor circuitry configured to generate a first measurement of said electrical characteristic at said first value and to generate a second measurement of said electrical characteristic at said second value,
wherein the sensor circuitry is further configured to detect, based on a difference between said first measurement and said second measurement, presence of one or more of a) the at least one secondary unit including the regulator and b) the foreign object located in proximity to said wireless power transmitter.

2. The wireless power transmitter of claim 1 wherein said driver circuitry is a DC-to-AC converter.

3. The wireless power transmitter of claim 1, wherein the sensor circuitry is configured to assess an effect of driving said primary coil from said first value to said second value.

4. The wireless power transmitter of claim 1 wherein the electrical characteristic of the wireless power transmitter is a level of power being drawn from the primary coil.

5. The wireless power transmitter of claim 1 wherein said second value is larger than said first value.

6. The wireless power transmitter of claim 1 wherein said sensor circuitry is configured to determine that the foreign object is present in proximity to said wireless power transmitter if it is determined that said electrical characteristic of said wireless power transmitter has substantially changed as a result of driving said wireless power transmitter so that, in said driven state, said magnitude of said electrical drive signal supplied to said primary coil of said wireless power transmitter changes from said first value to said second value.

7. The wireless power transmitter of claim 1 wherein said sensor circuitry is configured to detect presence of one or more of a) a first secondary unit of the at least one secondary unit and b) the foreign object, and wherein presence is determined based on secondary-unit compensation information relating to a parasitic load imposed on the wireless power transmitter by the first secondary unit so as to compensate for the parasitic load of the first secondary unit.

8. An inductive power transfer system including a wireless power transmitter and at least one secondary unit, the wireless power transmitter being operable to transmit power wirelessly to one or more of a) the at least one secondary unit and b) a foreign object located in proximity to the wireless power transmitter, said inductive power transfer system comprising:
a secondary coil configured to receive power transmitted wirelessly from a primary coil of the wireless power transmitter;
a regulator operably coupled to said secondary coil, said regulator configured to regulate power drawn from said secondary coil and to provide regulated power to a load such that power drawn from said secondary coil is at or above an operating threshold of said regulator;
processing circuitry configured to predetermine a rate for changing an electrical drive signal during a measurement phase;
driver circuitry operably coupled to said primary coil, said driver circuitry operable to drive said primary coil to transmit power sufficient to operate the regulator at or above the operating threshold, said driver circuitry operable to drive said primary coil so that, in the measurement phase, a magnitude of an electrical drive signal supplied to said primary coil changes from a first value by the predetermined rate to a second value, wherein power transmitted at said first value is sufficient to operate the regulator at or above the operating threshold and power transmitted at said second value is sufficient to operate the regulator at or above the operating threshold; and
sensor circuitry configured to sense an electrical characteristic of one or more of the driver circuitry and the primary coil, said sensor circuitry configured to generate a first measurement of said electrical characteristic at said first value and to generate a second measurement of said electrical characteristic at said second value,
wherein the sensor circuitry is further configured to detect, based on a difference between said first measurement and said second measurement, presence of one or more of a) the at least one secondary unit including the regulator and b) the foreign object located in proximity to said wireless power transmitter.

9. The inductive power transfer system of claim 8 wherein power drawn from said secondary coil by said regulator operating at or above said operating threshold is a known function of an input level.

10. The inductive power transfer system of claim 8 wherein said driver circuitry is a DC-to-AC converter.

11. The inductive power transfer system of claim 8, wherein the sensor circuitry is configured to assess an effect of driving said primary coil from said first value to said second value.

12. The inductive power transfer system of claim 8 wherein said electrical characteristic of the wireless power transmitter is a level of power being drawn from the wireless power transmitter.

13. The inductive power transfer system of claim 12 wherein a first secondary unit of the at least one secondary unit of the inductive power transfer system is configured such that, when in proximity to the wireless power transmitter and receiving power inductively therefrom, an electrical characteristic of the first secondary unit responds to such driving with an expected response, wherein said sensor circuitry is operable to determine if one or more of a) the first secondary unit and b) the foreign object are present in proximity to the wireless power transmitter in dependence upon results of such assessment and said expected response.

14. The inductive power transfer system of claim 13 wherein said electrical characteristic of the first secondary unit is its power drawn from the wireless power transmitter.

15. The inductive power transfer system of claim 14 wherein said expected response is that said electrical characteristic of the first secondary unit does not substantially change in response to driving the wireless power transmitter so that, in said driven state, said magnitude of said electrical drive signal supplied to the primary coil of the wireless power transmitter changes from said first value to said second value.

16. The inductive power transfer system of claim 8 wherein said first and second values are peak values or root-mean-square values of an alternating current passing through the primary coil of the wireless power transmitter.

17. A detection method for an inductive power transfer system, the inductive power transfer system including a wireless power transmitter operable to transmit power wirelessly to one or more of a) at least one secondary unit located in proximity to the wireless power transmitter and b) a foreign object located in proximity to the wireless power transmitter, the at least one secondary unit including a regulator with an operating threshold, the detection method comprising:

predetermining a rate for changing an electrical drive signal during a measurement phase;

driving the wireless power transmitter to transmit power sufficient to operate the regulator at or above the operating threshold and so that, during the measurement phase, a magnitude of an electrical drive signal supplied to a primary coil of the wireless power transmitter changes by the predetermined rate from a first value to a second value, wherein power transmitted at the first value is sufficient to operate the regulator at or above the operating threshold and power transmitted at the second value is sufficient to operate the regulator at or above the operating threshold;

sensing an electrical characteristic of the wireless power transmitter at the first value to generate a first measurement;

sensing the electrical characteristic of the wireless power transmitter at the second value to generate a second measurement; and detecting, based on a difference between the first measurement and the second measurement, presence of one or more of a) the at least one secondary unit including the regulator and b) the foreign object located in proximity to the wireless power transmitter.

18. The detection method of claim 17 wherein the electrical characteristic of the wireless power transmitter is a level of power being drawn from the wireless power transmitter.

19. The detection method of claim 17 wherein the electrical characteristic includes at least one of voltage and current.

20. The detection method of claim 17 comprising employing, when carrying out said detecting, secondary-unit compensation information relating to a parasitic load imposed on the wireless power transmitter by a first secondary unit of the at least one secondary unit so as to compensate for the parasitic load of the first secondary unit.

* * * * *